(12) United States Patent
Hegge

(10) Patent No.: US 8,874,160 B2
(45) Date of Patent: Oct. 28, 2014

(54) COMMUNICATION APPARATUS AND COMMUNICATION METHOD

(75) Inventor: Stephan Hegge, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1086 days.

(21) Appl. No.: 12/878,010

(22) Filed: Sep. 8, 2010

(65) Prior Publication Data

US 2011/0059691 A1 Mar. 10, 2011

(30) Foreign Application Priority Data

Sep. 9, 2009 (JP) ................................. 2009-208526

(51) Int. Cl.
*H04B 7/00* (2006.01)
*H04W 52/46* (2009.01)
*H04W 28/22* (2009.01)
*H04W 52/60* (2009.01)
*H04W 52/26* (2009.01)

(52) U.S. Cl.
CPC .............. *H04W 52/46* (2013.01); *H04W 28/22* (2013.01); *H04W 52/60* (2013.01); *H04W 52/262* (2013.01); *H04W 52/265* (2013.01); *H04W 52/267* (2013.01)
USPC ..................... 455/522; 455/67.11; 455/452.2; 370/235; 370/318

(58) Field of Classification Search
CPC ............ H04W 52/262; H04W 52/265; H04W 52/267; H04W 52/60; H04W 28/22
USPC ............ 455/522, 67.11, 452.2, 453; 370/232, 370/235, 318, 328
See application file for complete search history.

(56) References Cited

U.S. PATENT DOCUMENTS

| | | | |
|---|---|---|---|
| 6,850,512 B1 * | 2/2005 | Bishop et al. | 370/342 |
| 6,999,785 B2 * | 2/2006 | Kito | 455/522 |
| 7,012,904 B2 * | 3/2006 | Taketsugu | 370/329 |
| 7,274,730 B2 | 9/2007 | Nakabayashi | |
| 7,386,324 B2 * | 6/2008 | Moriyama et al. | 455/556.2 |
| 8,310,929 B1 * | 11/2012 | Srinivas et al. | 370/232 |
| 2002/0009059 A1 * | 1/2002 | Abutaleb et al. | 370/318 |
| 2004/0214580 A1 * | 10/2004 | Chen et al. | 455/452.1 |
| 2006/0253736 A1 | 11/2006 | Rudolf et al. | |
| 2009/0046665 A1 * | 2/2009 | Robson et al. | 370/332 |
| 2009/0141631 A1 * | 6/2009 | Kim et al. | 370/235 |
| 2009/0238110 A1 * | 9/2009 | Suzuki | 370/328 |
| 2010/0240373 A1 * | 9/2010 | Ji et al. | 455/436 |

FOREIGN PATENT DOCUMENTS

| | | |
|---|---|---|
| JP | 2004-112780 A | 4/2004 |
| JP | 2005-534232 A | 11/2005 |
| JP | 2007-281541 A | 10/2007 |
| JP | 2008-530849 A | 8/2008 |
| JP | 2008-538465 | 10/2008 |
| JP | 2002-043959 | 2/2010 |
| WO | WO-2004/010604 A1 | 1/2004 |
| WO | WO-2006/083139 A1 | 8/2006 |

* cited by examiner

*Primary Examiner* — Duc M Nguyen
(74) *Attorney, Agent, or Firm* — Fujitsu Patent Center

(57) ABSTRACT

A communication apparatus that is coupled to a mobile terminal through a wireless link and to a network through a wired link, and that is relaying communications between the mobile terminal and the network. The communication apparatus includes a first transmission-rate acquisition unit and a power control unit. The first transmission-rate acquisition unit acquires wired-link information related to a transmission rate in the wired link. The power control unit controls at least one of a first transmission power of the communication apparatus in downlink transmission to the mobile terminal and a second transmission power of the mobile terminal in uplink transmission from the mobile terminal so as to reduce the difference between a transmission rate in the wireless link and the transmission rate in the wired link.

4 Claims, 20 Drawing Sheets

| Wireless Transmission Rate (Mbps) | MCS Index | Modulation Type | Encoding Ratio | SINR Condition |
|---|---|---|---|---|
| 6 | 0 | BPSK | 1/2 | SINR ≥ TH0 |
| 9 | 1 | BPSK | 3/4 | SINR ≥ TH1 |
| 12 | 2 | QPSK | 1/2 | SINR ≥ TH2 |
| 18 | 3 | QPSK | 3/4 | SINR ≥ TH3 |
| 24 | 4 | 16-QAM | 1/2 | SINR ≥ TH4 |
| 36 | 5 | 16-QAM | 3/4 | SINR ≥ TH5 |
| 48 | 6 | 64-QAM | 2/3 | SINR ≥ TH6 |
| 54 | 7 | 64-QAM | 3/4 | SINR ≥ TH7 |

FIG.3

| Number of Spatial Streams | Wireless Transmission Rate (Mbps) | MCS Index | Modulation Type | Encoding Ratio | SINR Condition |
|---|---|---|---|---|---|
| 1 | 6.5 | 0 | BPSK | 1/2 | SINR ≥ TH10 |
| 1 | 13.0 | 1 | QPSK | 1/2 | SINR ≥ TH11 |
| 1 | 19.5 | 2 | QPSK | 3/4 | SINR ≥ TH12 |
| 1 | 26.0 | 3 | 16-QAM | 1/2 | SINR ≥ TH13 |
| 1 | 39.0 | 4 | 16-QAM | 3/4 | SINR ≥ TH14 |
| 1 | 52.0 | 5 | 64-QAM | 2/3 | SINR ≥ TH15 |
| 1 | 58.5 | 6 | 64-QAM | 3/4 | SINR ≥ TH16 |
| 1 | 65.0 | 7 | 64-QAM | 5/6 | SINR ≥ TH17 |
| 2 | 13.0 | 8 | BPSK | 1/2 | SINR ≥ TH20 |
| 2 | 26.0 | 9 | QPSK | 1/2 | SINR ≥ TH21 |
| 2 | 39.0 | 10 | QPSK | 3/4 | SINR ≥ TH22 |
| 2 | 52.0 | 11 | 16-QAM | 1/2 | SINR ≥ TH23 |
| 2 | 78.0 | 12 | 16-QAM | 3/4 | SINR ≥ TH24 |
| 2 | 104.0 | 13 | 64-QAM | 2/3 | SINR ≥ TH25 |
| 2 | 117.0 | 14 | 64-QAM | 3/4 | SINR ≥ TH26 |
| 2 | 130.0 | 15 | 64-QAM | 5/6 | SINR ≥ TH27 |
| 3 | 19.5 | 16 | BPSK | 1/2 | SINR ≥ TH30 |
| 3 | 39.0 | 17 | QPSK | 1/2 | SINR ≥ TH31 |
| 3 | 58.5 | 18 | QPSK | 3/4 | SINR ≥ TH32 |
| 3 | 78.0 | 19 | 16-QAM | 1/2 | SINR ≥ TH33 |
| 3 | 117.0 | 20 | 16-QAM | 3/4 | SINR ≥ TH34 |
| 3 | 156.0 | 21 | 64-QAM | 2/3 | SINR ≥ TH35 |
| 3 | 175.5 | 22 | 64-QAM | 3/4 | SINR ≥ TH36 |
| 3 | 195.0 | 23 | 64-QAM | 5/6 | SINR ≥ TH37 |
| 4 | 26.0 | 24 | BPSK | 1/2 | SINR ≥ TH40 |
| 4 | 52.0 | 25 | QPSK | 1/2 | SINR ≥ TH41 |
| 4 | 78.0 | 26 | QPSK | 3/4 | SINR ≥ TH42 |
| 4 | 104.0 | 27 | 16-QAM | 1/2 | SINR ≥ TH43 |
| 4 | 156.0 | 28 | 16-QAM | 3/4 | SINR ≥ TH44 |
| 4 | 208.0 | 29 | 64-QAM | 2/3 | SINR ≥ TH45 |
| 4 | 234.0 | 30 | 64-QAM | 3/4 | SINR ≥ TH46 |
| 4 | 260.0 | 31 | 64-QAM | 5/6 | SINR ≥ TH47 |

FIG.15

COMMUNICATION APPARATUS AND COMMUNICATION METHOD

CROSS-REFERENCE TO RELATED APPLICATIONS

This application is based upon and claims the benefits of priority from the prior Japanese Patent Application No. 2009-208526, filed on Sep. 9, 2009, the entire contents of which are incorporated herein by reference.

FIELD

The present invention relates to techniques for relaying communications performed between a mobile terminal and a network through a wireless link coupled to the mobile terminal and through a wired link coupled to the network.

BACKGROUND

Currently, use of a small-size wireless base station called an access point base station (or a femtocell base station or a femtocell) is spreading for environmental improvement in interior wireless communication. In the interior of houses or buildings, the access point base station performs wireless communication with a plurality of mobile terminals, and is coupled to a network through a wired backhaul connection such as ADSL (Asymmetric Digital Subscriber Line). In such an access point base station, in order to avoid interference with other base stations around the access point base station, the quality of the wireless link is measured, and the transmission power is controlled according to the measurement result.

Japanese Laid-open Patent Publication No. 2002-043959 discloses a use of transmission power control in wireless communication in a communication system in which relatively massive data are transmitted through a wired section and a wireless section. In this communication system, it is recognized that the wireless section has a lower transmission rate than the wired section. Based on this recognition, data which has been transmitted through a wired section is temporarily stored by a data buffering means in an access point base station before the data is wirelessly transmitted to a destination (requesting the data). The data transfer rate in the wireless section is increased by the access point base station when the amount of data accumulated in the data buffering means is large. At this time, the increase in the data transfer rate is realized by an increase in the transmission power.

Furthermore, International Patent Publication No. WO2006/110492 discloses a mesh wireless communication network which is constituted by a plurality of mesh points (MPs). In the mesh wireless communication network, information on setting of an allowed power level is transmitted from an existing MP to a new MP, and the new MP adjusts the power level in accordance with the transmitted information.

The recent development in the wireless communication technology toward IEEE802.11n and 4G (fourth generation of cellular wireless standards) has raised expectations for further increase in the transmission rate in wireless communication. With such a high transmission rate in wireless communication, a very high transmission power is expected to be used in the wireless links between the access point base station and mobile terminals, and can therefore cause interference with other cells around the access point base station.

On the other hand, the transmission rates in the wireless links between mobile terminals and a communication device such as the access point base station are expected to exceed the transmission rate in the wired link through a backhaul line in the future. If the transmission power is adjusted when the amount of data accumulated in the data buffering means in the access point base station is determined to be large, as in the conventional communication system mentioned above, the data transfer is delayed because the data buffering means has to wait until a predetermined time elapses for measuring the amount of the accumulated data.

SUMMARY

Accordingly, it is an object of the invention to provide a communication apparatus and a communication process which can suppress interference with adjacent cells although the interference can be caused in a wireless link with a mobile terminal when communication between the mobile terminal and a network is relayed.

According to an aspect of an embodiment of the invention, it is provided a communication apparatus being coupled to a mobile terminal through a wireless link and to a network through a wired link, for relaying communication between the mobile terminal and the network. The communication apparatus includes:

(A) a first transmission-rate acquisition unit for acquiring wired-link information related to a transmission rate in the wired link; and (B) a power control unit for controlling at least one of a first transmission power of the communication apparatus in downlink transmission to the mobile terminal and a second transmission power of the mobile terminal in uplink transmission from the mobile terminal so as to reduce a difference between a transmission rate in the wireless link and the transmission rate in the wired link.

According to the other aspect of an embodiment of the invention, it is provided a communication method for relaying communications between a mobile terminal and a network through a wireless link coupled to the mobile terminal and through a wired link coupled to the network.

The objects and advantages of the invention will be realized and attained by means of the elements and combinations particularly pointed out in the claims.

It is to be understood that both the forgoing general description and the following detailed description are exemplary and explanatory and are not restrictive of the invention, as claimed.

BRIEF DESCRIPTION OF THE DRAWINGS

Referring now to the attached drawings which form a part of this original disclosure:

FIG. 3 is a diagram indicating examples of correspondences between SINR conditions and optional MCSs in the access point base station according to the first embodiment;

FIG. 15 is a diagram indicating examples of correspondences between SINR conditions and optional MCSs for each of the numbers of spatial streams according to a fourth embodiment;

DESCRIPTION OF EMBODIMENTS

Hereinbelow, the wireless relay devices according to the embodiments of the present invention are explained in detail.

1. First Embodiment 1.1 Communication System

Figure 1:
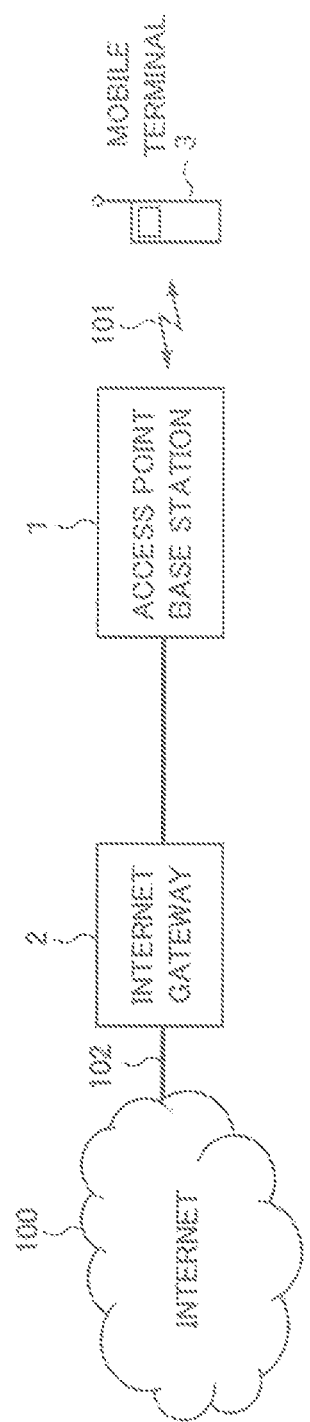
FIG. 1 is a diagram illustrating an outline of a communication system according to a first embodiment.

FIG. 1 is a diagram illustrating an outline of the communication system according to the first embodiment. As illustrated in FIG. 1, the communication system according to the present embodiment includes an access point base station 1, an Internet gateway 2, and a mobile terminal 3. Although the Internet gateway 2 is arranged separately from the access point base station 1 in the example of FIG. 1, the Internet gateway 2 and the access point base station 1 may be alternatively integrated into a single apparatus. The access point base station 1 accommodates a plurality of mobile terminals (although only the mobile terminal 3 is illustrated in FIG. 1), and performs wireless communication with each mobile terminal through a wireless link 101. In addition, the access point base station 1 performs communication with the Internet 100 through the Internet gateway 2 and a wired backhaul link 102.

For example, the communication system illustrated in FIG. 1 can be typically constructed in an indoor space which may not be able to be covered by a large-sized wireless base station, while mobile terminals in the indoor space can be coupled to a network, for example, the Internet. Coupled through the wired backhaul link 102 is not limited to the Internet, but may be another network including a LAN (Local Area Network), or a specific information processing device including a computer, a storage device, or the like.

In the communication system illustrated in FIG. 1, the access point base station 1 serves as a relay which connects the mobile terminal 3 and the Internet 100. If no specific control operation is performed in the access point base station 1, the transmission rates in the wireless link 101 are not necessarily identical to the transmission rates in the backhaul link 102. If the transmission rates in the wireless link 101 significantly differ from the transmission rates in the backhaul link 102, the following two problems can occur.

The first problem can occur in the case where the transmission rates in the wireless link 101 are set regardless of the transmission rates in the backhaul link 102. In this case, the transmission power from the access point base station 1 or the mobile terminal 3 can be too large and can cause interference with adjacent cells.

The second problem can occur in the case where the transmission rates in the wireless link 101 significantly differ from the transmission rates in the backhaul link 102. In this case, the access point base station 1 is required to buffer communication data, thereby causing delay in data transfer due to the processing for buffering data.

The above problems become pronounced in the case where the transmission rates in the wireless link 101 are higher than the transmission rates in the backhaul link 102 and where the communication between the mobile terminal 3 and the Internet 100 is performed in real-time (for example, as in the case of VoIP).

In order to solve the above problems, in the communication system according to the present embodiment, the access point base station 1 acquires the transmission rates in the backhaul link 102, and controls the transmission rates in the wireless link 101 so as to minimize the differences (and preferably to have zero differences) between the transmission rates in the wireless link 101 and the transmission rates in the backhaul link 102. With this control, the amount of the buffered data resulted from the differences between the transmission rates in the wireless link 101 and the transmission rates in the backhaul link 102 can be reduced and the delay in data transfer caused by the buffering process can be avoided. In addition, in the case where the wireless link 101 is capable of transmission rates higher than the transmission rates in the backhaul link 102, the unnecessarily high transmission rates in the wireless link 101 are controlled and limited, and the interference with the adjacent cells can be suppressed.

1.2 Configuration of Access Point Base Station

Figure 2:
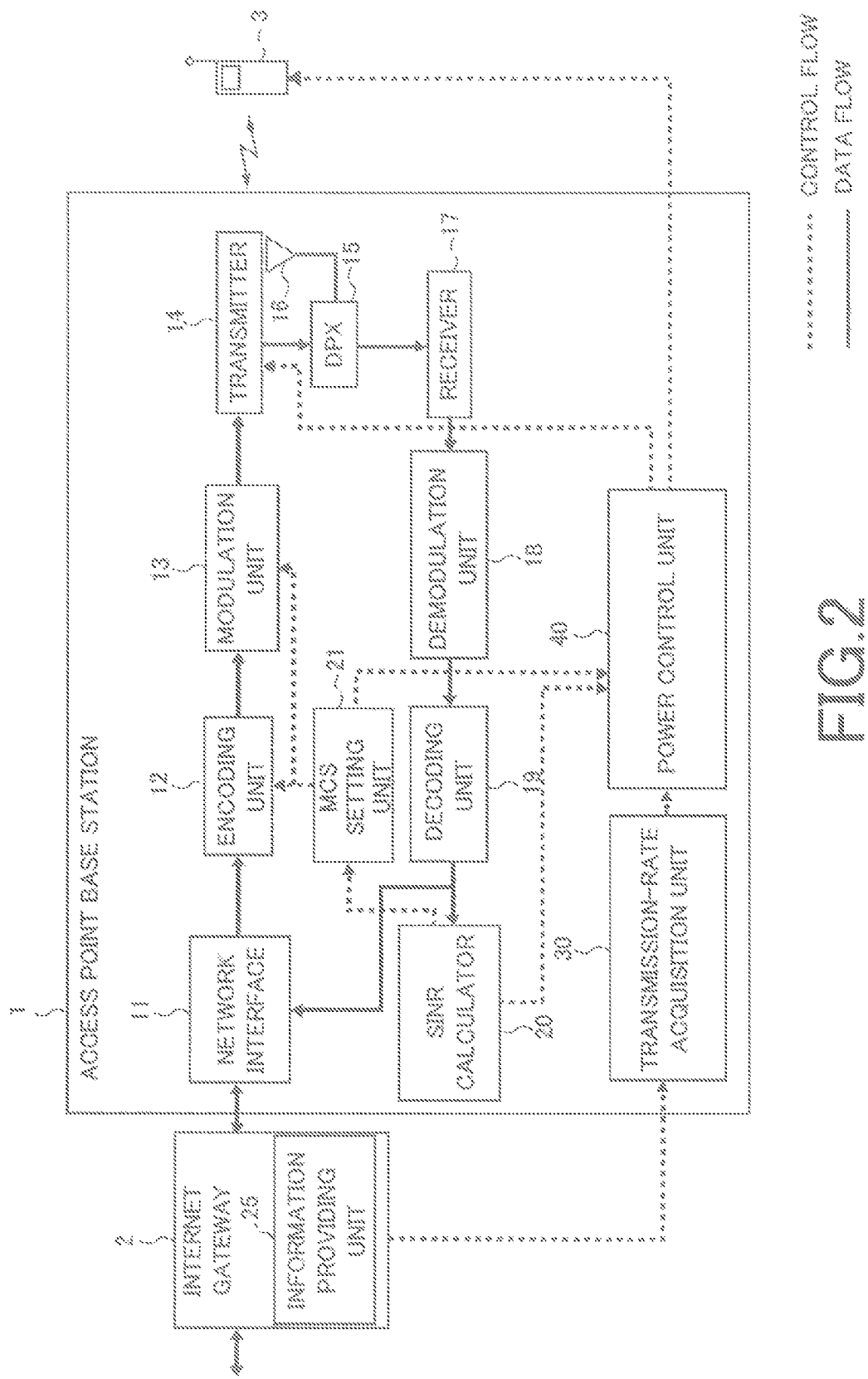
FIG. 2 is a block diagram illustrating a representative portion of a configuration of an access point base station according to the first embodiment.

An example of a configuration of the access point base station 1 according to the first embodiment is explained below with reference to FIG. 2, which illustrates a representative portion of the configuration of the access point base station 1. As illustrated in FIG. 2, the access point base station 1 comprises a network interface 11, an encoding unit 12, a modulation unit 13, a transmitter 14, a duplexer (DPX) 15, an antenna 16, a receiver 17, a demodulation unit 18, a decoding unit 19, an SINR (Signal to Interference plus Noise Ratio) calculator 20, a transmission-rate acquisition unit 30 (corresponding to the aforementioned first transmission-rate acquisition unit), and a power control unit 40. The duplexer 15 is provided to allow the antenna 16 to be used in both transmission and reception. In the present embodiment, the antenna 16 is assumed to be a single antenna.

The receiver 17 includes a band-limit filter, a low-noise amplifier, a local-frequency oscillator, an orthogonal demodulator, an AGC (automatic gain control) amplifier, an A/D (analog-to-digital) converter, and other components. The receiver 17 downconverts a signal (RF signal) received through the antenna 16 from a RF frequency to a baseband frequency. The baseband signal obtained by the receiver 17 is then separated into a data signal, a control signal, and a pilot signal (which is a predetermined reference signal), and the separated signals are respectively demodulated by the demodulation unit 18. The demodulated pilot signal undergoes error correction in the decoding unit 19, and is then supplied to the SINR calculator 20. The demodulated data signal is transmitted to the Internet gateway 2 through the network interface 11.

The SINR calculator 20 calculates an SINR (Signal to Interference plus Noise Ratio) value as an index of communication quality (level) of the uplink on the basis of the pilot signal demodulated by the decoding unit 19. The SINR value may be calculated by any known method, and is sent to an MCS setting unit 21. Although the pilot signal is used for the calculation of the SINR value in the above example, other reference signals (e.g., the sounding signal) may be used.

The MCS setting unit 21 is provided in the access point base station 1 for realizing adaptive modulation and coding (AMC). That is, the MCS setting unit 21 has a plurality of modulation and encoding schemes (MCSs), and selects one of the modulation and encoding schemes (MCSs) according to the SINR value in the wireless link. Each of the modulation and encoding schemes indicates a combination a modulation type and an encoding ratio. For example, when the SINR value in the wireless link is greater, a modulation type (e.g., 64 QAM) achieving higher transmission efficiency while being less resistant to interference is selected. On the other hand, when the SINR value in the wireless link is smaller, a modulation type (e.g., BPSK) achieving lower transmission efficiency while being more resistant to interference is selected. The communication quality of the wireless link is more satisfactory when the SINR value in the wireless link is relatively great, and unsatisfactory when the SINR value in the wireless link is relatively small.

FIG. 3 is a diagram illustrating examples of correspondences between SINR conditions and optional MCSs. The relationships are preset in the MCS setting unit 21. The information indicated in FIG. 3 (which corresponds to the first information) is stored in a first memory of the MCS setting unit 21 in the access point base station. In FIG. 3, TH0 to TH7 each denotes a threshold for the SINR value, where TH0<TH1< . . . <TH6<TH7. The thresholds for the SINR values may be fixed values. The MCS setting unit 21 determines an MCS or MCS index on the basis of the relationships between the SINR conditions and the optional MCSs. Where SINR>TH7 in FIG. 3, all the other MCS conditions are satisfied, and the MCS setting unit 21 can therefore select any MCS. The communication quality is superior where SINR>TH7 in the above example. Normally, the MCS setting unit 21 selects the fastest MCS corresponding to the MCS index 7.

As explained before, the SINR calculator calculates the SINR value indicating the communication quality (level) of the uplink, and supplies the SINR value to the MCS setting unit 21. On the other hand, the SINR value indicating the communication quality of the downlink is calculated by the mobile terminal 3, and the access point base station 1 is informed of the SINR value in the downlink by the mobile terminal 3 through the uplink communication. For example, the information on the SINR value in the downlink is contained in a control signal transmitted from the mobile terminal 3 through the uplink to the access point base station 1. After the control signal is decoded by the decoding unit 19, the SINR value in the downlink contained in the control signal is supplied to the MCS setting unit 21.

The encoding unit 12 performs processing for encoding and error correction of a signal which is to be transmitted to the mobile terminal 3 (where the signal can contain a data signal, a control signal, and a pilot signal), and the modulation unit 13 modulates the encoded signal. At this time, an MCS index determined on the basis of the communication quality (level) of the uplink (specifically, on the basis of the SINR value calculated by the SINR calculator 20) is inserted into the control signal to be transmitted to the mobile terminal 3. On the other hand, another MCS index determined on the basis of the communication quality (level) of the downlink (specifically, on the basis of the SINR value of which the access point base station 1 is informed by the mobile terminal 3) is used in transmission of the signal to the mobile terminal 3.

The transmitter 14 comprises a D/A (digital to analog) converter, a local frequency oscillator, a mixer, a power amplifier, a filter, and the like. The transmitter 14 upconverts the signal to be transmitted (in the form of a baseband signal) from a baseband frequency into a RF frequency, and transmits the upconverted signal through the antenna 16.

The transmission-rate acquisition unit 30 (corresponding to the aforementioned first transmission-rate acquisition unit) acquires information on the transmission rates in the backhaul link 102 (i.e., the transmission rate in the wired link) from an information providing unit 25 in the Internet gateway 2. The concrete manner of acquiring the transmission rates in the backhaul link 102 will be explained later. The transmission-rate acquisition unit 30 outputs the acquired information on the transmission rates in the backhaul link 102 to the power control unit 40.

The power control unit 40 adjusts a voltage applied to the power amplifier in the transmitter 14 (the output power of which corresponds to the aforementioned first transmission power) and/or a voltage applied to a power amplifier in a transmitter 54 (explained later) in the mobile terminal 3 (the output power of which corresponds to the aforementioned second transmission power). Specifically, the voltage applied to the power amplifier in the transmitter 54 is controlled by the control signal transmitted from the access point base station 1 to the mobile terminal 3 through the downlink. That is, the control signal transmitted to the mobile terminal 3 contains information on a control variable for controlling the voltage applied to the power amplifier in the transmitter 54 or a target value of the voltage applied to the power amplifier in the transmitter 54. In FIG. 2, the above control over the mobile terminal 3 is schematically indicated by the bold dashed line having an arrow and extending from the power control unit 40 to the mobile terminal 3.

1.3 Configuration of Mobile Terminal

Figure 4:
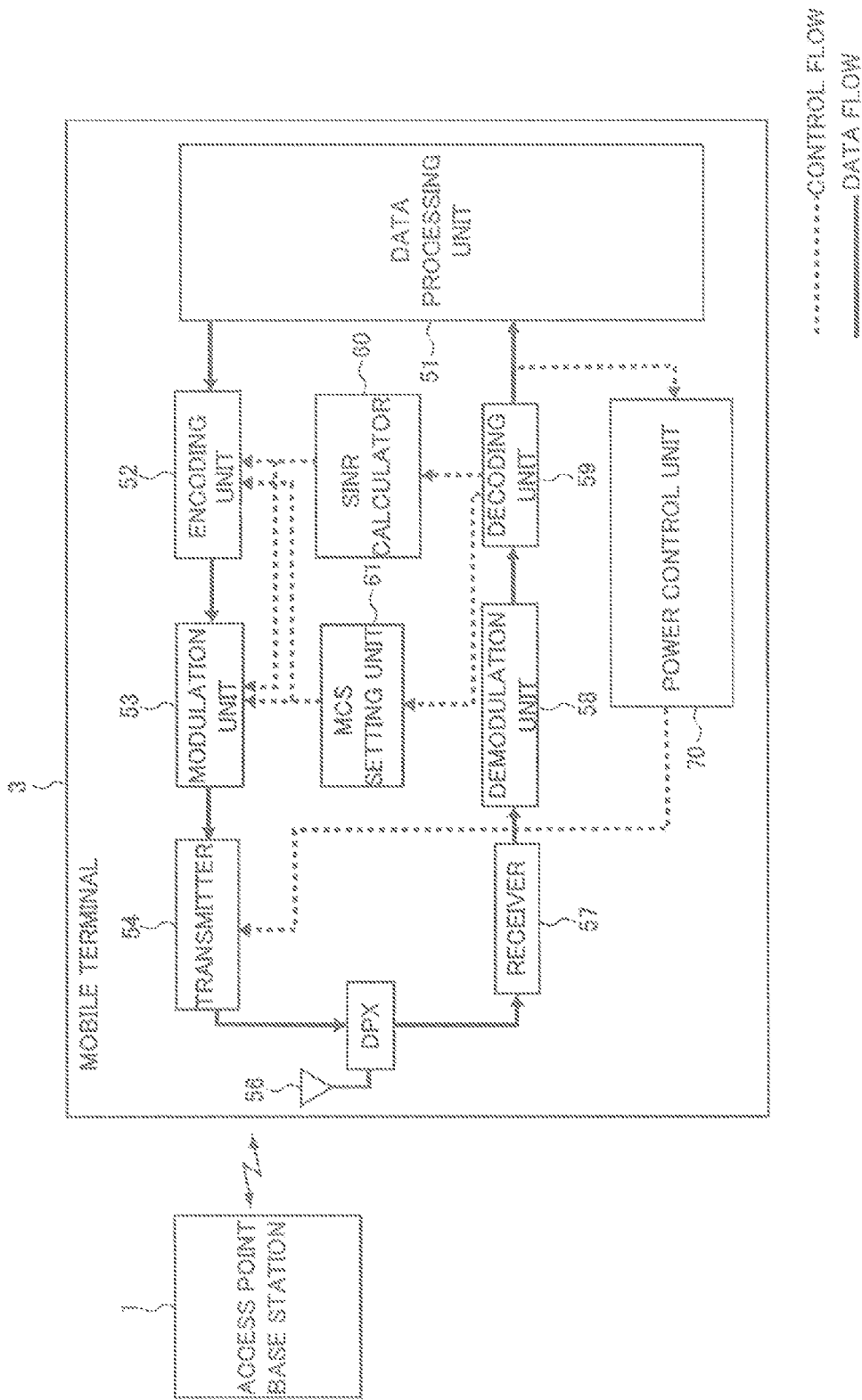
FIG. 4 is a block diagram illustrating a representative portion of a configuration of a mobile terminal according to the first embodiment.

An example of a configuration of the mobile terminal 3 is explained below with reference to FIG. 4, which illustrates a representative portion of the configuration of the mobile terminal 3. As illustrated in FIG. 4, the mobile terminal 3 comprises a data processing unit 51, an encoding unit 52, a modulation unit 53, the transmitter 54, a duplexer 55, an antenna 56, a receiver 57, a demodulation unit 58, a decoding unit 59, an SINR calculator 60, an MCS setting unit 61, and a power control unit 70. The duplexer (DPX) 55 is provided to allow the antenna 56 to be used in both transmission and reception. In the present embodiment, the antenna 56 in the mobile terminal 3 is assumed to be a single antenna.

The receiver 57 includes a band-limit filter, a low-noise amplifier, a local-frequency oscillator, an orthogonal demodulator, an AGC (automatic gain control) amplifier, an A/D (analog-to-digital) converter, and other components. The receiver 57 downconverts a signal (RF signal) received through the antenna 56 from a RF frequency to a baseband frequency. The baseband signal obtained by the receiver 57 is then separated into a data signal, a control signal, and a pilot signal (which is a predetermined reference signal), and the separated signals are respectively demodulated by the demodulation unit 58. The demodulated pilot signal undergoes error correction in the decoding unit 59, and is then supplied to the SINR calculator 60. The demodulated data signal is sent to the data processing unit 51.

The SINR calculator 60 calculates an SINR value as an index of communication quality (level) of the downlink on the basis of the pilot signal outputted from the decoding unit 59. The SINR value may be calculated by any known method, and the SINR value calculated by the SINR calculator 60 is inserted into a control signal which is to be transmitted to the access point base station 1 in order to inform the access point base station 1 of the SINR value. Although the pilot signal is used for the calculation of the SINR value in the above example, other reference signals (e.g., the sounding signal) may be used.

The MCS setting unit 61 sets an MCS which is to be applied to transmission of a signal to the access point base station 1 through the uplink, on the basis of the MCS index contained in the control signal transmitted from the access point base station 1. The MCS setting unit 61 has a memory that stores information indicating the MCSs respectively corresponding to the MCS indexes which are to be transmitted from the access point base station 1, as indicated in FIG. 3.

The encoding unit 52 performs processing for encoding and error correction of a signal which is to be transmitted to the access point base station 1 (where the signal can contain a data signal, a control signal, and a pilot signal), and the modulation unit 53 modulates the encoded signal. The type of modulation and encoding set by the MCS setting unit 61 is applied to the transmission of the signal through the uplink.

The transmitter 54 comprises a D/A (digital to analog) converter, a local frequency oscillator, a mixer, the aforementioned power amplifier, a filter, and the like. The transmitter 54 upconverts the signal to be transmitted (as a baseband signal) from the baseband frequency into the RF frequency, and transmits the upconverted signal through the antenna 56.

The power control unit 70 extracts the aforementioned information on the control variable for the voltage applied to the power amplifier in the transmitter 54 or the target value of the voltage applied to the power amplifier in the transmitter 54, from the control signal decoded by the decoding unit 59, and adjusts the voltage applied to the power amplifier in the transmitter 54 in accordance with the extracted information.

In the above explanations on the configurations of the access point base station 1 and the mobile terminal 3, it is assumed that the communication in the uplink and the downlink under the automatic modulation control (AMC) is performed in the manner of FDD (Frequency Division Duplex). In the manner of FDD, the correlation between the communication quality of the uplink and that of the downlink is considered to be low. However, in the case where the communication in the uplink and the downlink under the automatic modulation control (AMC) is performed in the manner of TDD (Time Division Duplex), the procedure of informing the access point base station 1 of the SINR value by the mobile terminal 3 may be omitted. In this case, the access point base station 1 determines, on the basis of the SINR value calculated in the access point base station 1, an MCS which is applied to the communication in both the uplink and the downlink.

1.4 Acquisition of Transmission Rates in Backhaul Link

Manners of acquiring the transmission rates in the backhaul link 102 are explained below with reference to FIGS. 5 to 7.

Figure 5:
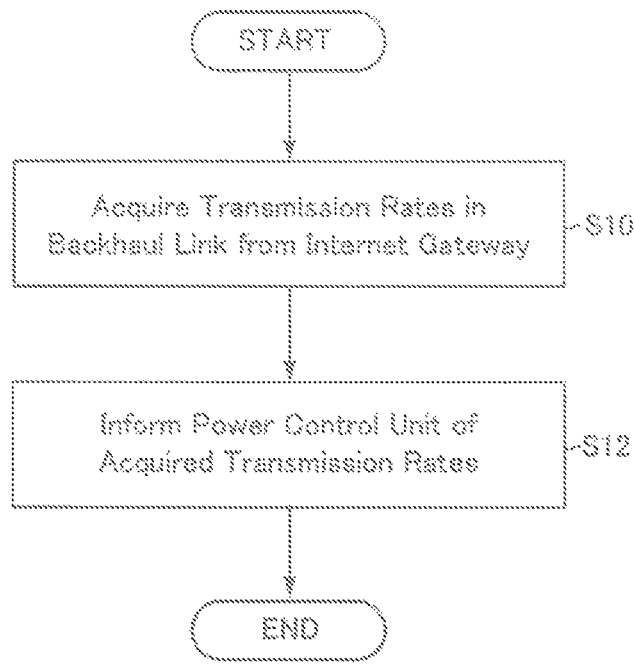
FIG. 5 is a flow diagram indicating a process for acquiring the transmission rates in a backhaul link according to the first embodiment.

FIG. 5 is a flow diagram illustrating a process for acquiring the transmission rates in the backhaul link according to the first embodiment. As indicated in FIG. 5, in step S10, the transmission-rate acquisition unit 30 in the access point base station 1 acquires the transmission rates (preferably the maximum transmission rates) in the uplink and the downlink in the backhaul link 102, from the information providing unit 25 in the Internet gateway 2. Subsequently, in step S12, the transmission-rate acquisition unit 30 informs the power control unit 40 of the transmission rates acquired in step S10. That is, the transmission-rate acquisition unit 30 sends to the power control unit 40 the information on the transmission rates acquired in step S10.

Specifically, the transmission rates in the backhaul link 102 can be acquired, for example, by using the IGD (Internet Gateway Device) protocol or SNMP (Simple Network Management Protocol). The IGD protocol is defined in the UPnP (Universal Plug and Play) standard. A sequence of processing for acquiring the transmission rates in the backhaul link 102 by using the IGD protocol is illustrated in FIG. 6, and a sequence of processing for acquiring the transmission rates in the backhaul link 102 by using SNMP is illustrated in FIG. 7.

The sequence of the processing for acquiring the transmission rates in the backhaul link 102 by using the IGD protocol (defined in UPnP) is explained below with reference to FIG. 6. As illustrated in FIG. 6, first, in step S20, the access point base station 1 broadcasts information indicating the existence of the access point base station 1 by performing a network query, i.e., by broadcasting a specific message (e.g., the advertisement/network query message). All devices which support UPnP (which are hereinafter referred to as UPnP-compatible devices) return, in step S21, information on each UPnP-compatible device and information on a service which each UPnP-compatible device can provide, to the access point base station 1 in response to the above specific message. Then, in steps S22 and S23, the access point base station 1 refers to each UPnP-compatible device for a detailed list of information on capabilities of the device, and receives a response from each UPnP-compatible device. Finally, in steps S24 and S25, the access point base station 1 inquires of the Internet gateway 2 about the transmission rates (e.g., the maximum transmission rates) in the uplink and the downlink by using specific messages (e.g., the UpstreamMaxBitRate message and the DownstreamMaxBitRate message), and receives a response.

The sequence of the processing for acquiring the transmission rates in the backhaul link 102 by using SNMP is explained below with reference to FIG. 7. As illustrated in FIG. 7, first, in step S30, the transmission-rate acquisition unit 30 transmits to the information providing unit 25 a message for inquiring about the transmission rates in the backhaul link 102. In response to the message, in step S32, the information providing unit 25 transmits the information on the transmission rates in the backhaul link 102.

Figure 6:
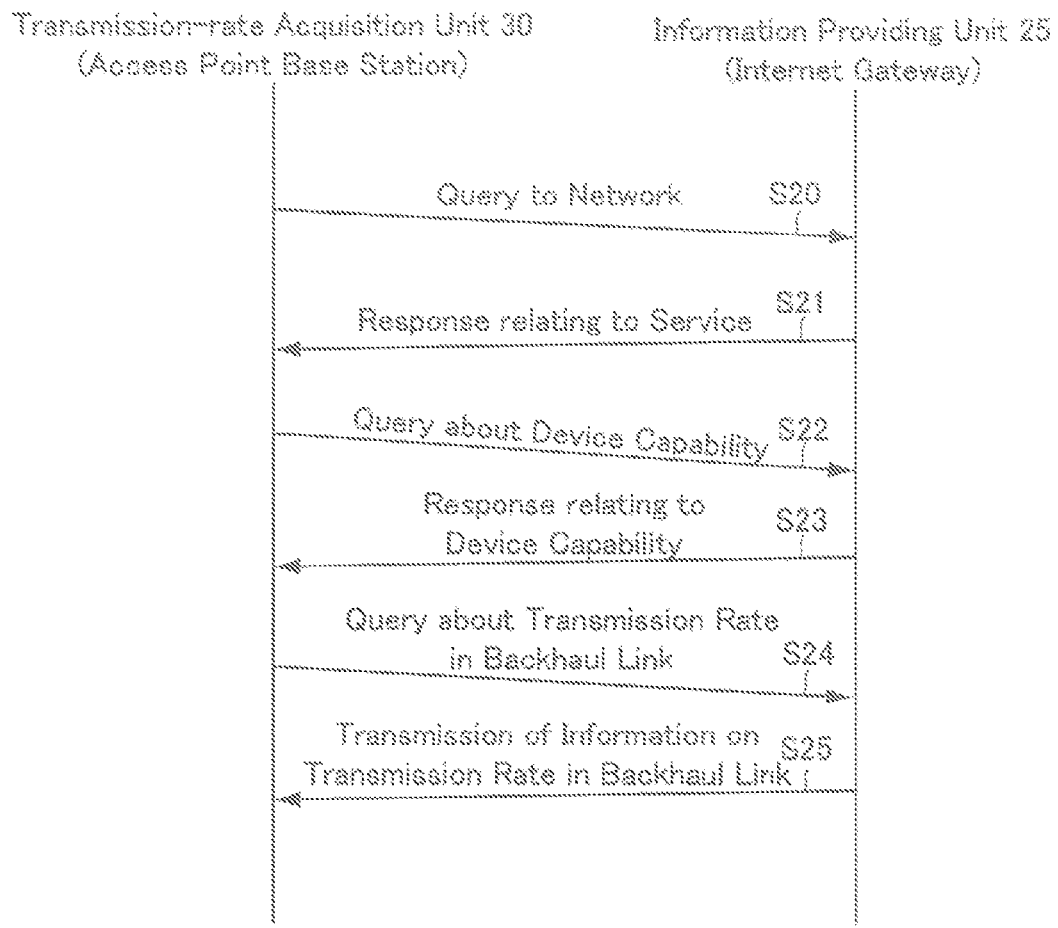
FIG. 6 is a sequence diagram indicating a process for acquiring the transmission rates in the backhaul link according to the first embodiment.
Figure 7:
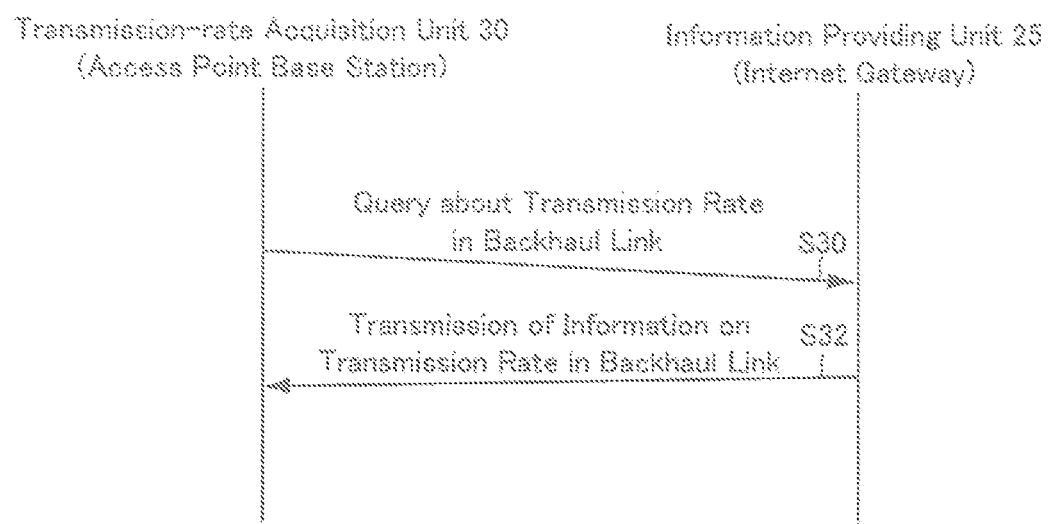
FIG. 7 is a sequence diagram indicating a process for acquiring the transmission rates in the backhaul link according to the first embodiment.

The processing as illustrated, for example, in FIG. 6 or 7 is performed between the transmission-rate acquisition unit 30 in the access point base station 1 and the information providing unit 25 in the Internet gateway 2.

1.5 Control of Power Amplifiers in Transmitters

Figure 8:
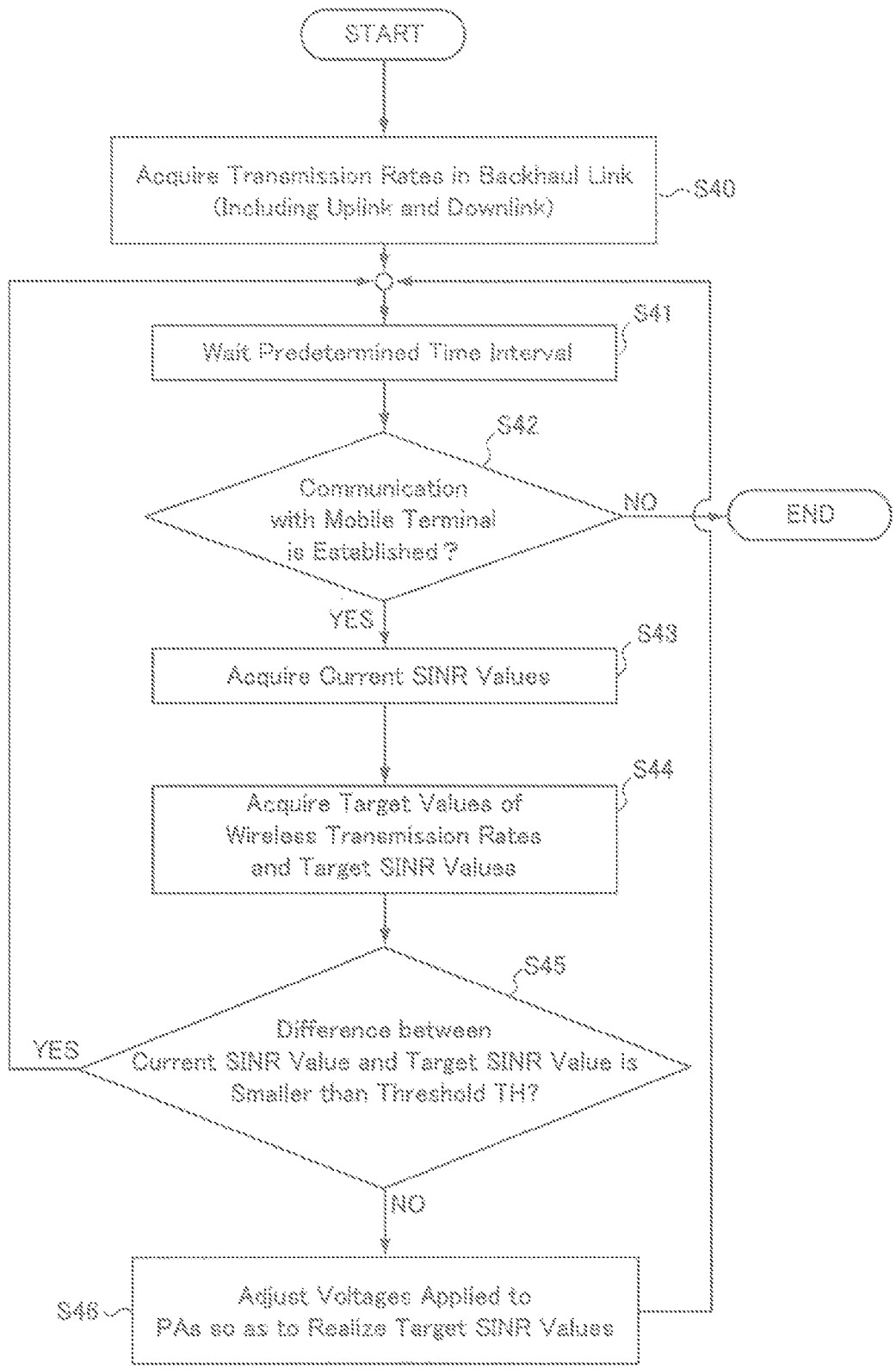
FIG. 8 is a flow diagram indicating a control process performed by the access point base station according to the first embodiment.

A process for controlling the power amplifiers in the transmitters in the access point base station 1 and the mobile terminal 3 is explained below with reference to FIG. 8, which is a flow diagram illustrating a control process performed by the access point base station according to the first embodiment. The process of FIG. 8 is mainly performed by the access point base station 1 (and in particular, by the power control unit 40).

First, in step S40, the transmission-rate acquisition unit 30 in the access point base station 1 acquires from the information providing unit 25 in the Internet gateway 2 information on the transmission rates in the backhaul link 102 in the manner explained with reference to FIGS. 5, 6, and 7. Since the transmission rates in the backhaul link 102 are considered not to greatly vary with time, the transmission-rate acquisition unit 30 acquires the information on the transmission rates in the backhaul link 102 only once in the example explained here. Alternatively, the transmission-rate acquisition unit 30 may acquire samples on the transmission rates in the backhaul link 102 a plurality of times, and perform statistical processing, for example, a process for averaging the samples.

Subsequently, the access point base station 1 waits for a predetermined time interval in step S41. The time interval is set such that the operation of controlling the power amplifiers is not performed too frequently. When the predetermined time interval elapses, the operation goes to step S42, in which it is determined whether or not a communication with the mobile terminal 3 is established. When the communication with the mobile terminal 3 is not established (i.e., when determined to be "NO" in step S42), the process of FIG. 8 is ended.

When the communication with the mobile terminal 3 is established (i.e., when determined to be "YES" in step S42), the power control unit 40 acquires the current SINR values of the uplink and the downlink from the SINR calculator 20 and the MCS setting unit 21, respectively, in step S43. That is, the power control unit 40 acquires the SINR value in the uplink from the SINR calculator 20, and the SINR value in the downlink from the control signal transmitted from the mobile terminal 3. (That is, the power control unit 40 acquires the SINR value in the downlink from the information from the mobile terminal 3.)

Thereafter, in step S44, the power control unit 40 determines a target value of the wireless transmission rate in the wireless link 101 and a target SINR value in the wireless link 101 on the basis of the transmission rate in the backhaul link 102 obtained by the transmission-rate acquisition unit 30.

Here, the power control unit 40 determines the target value of the wireless transmission rates in the wireless link 101 such that the difference between the wireless transmission rates in the wireless link 101 and the transmission rates in the backhaul link 102 is reduced. Specifically, the target value of the wireless transmission rate in the uplink of the wireless link 101 and that in the downlink of the wireless link 101 are separately determined. The target value of the SINR in the uplink of the wireless link 101 and that in the downlink of the wireless link 101 are also separately determined.

A manner of determining the target values of the wireless transmission rates and the target SINR value in the wireless link 101 is explained below with reference to FIG. 3. In FIG. 3, values of wireless transmission rates corresponding to the respective MCSs are indicated. As one example, let us consider the case where the wireless transmission rate in the backhaul link 102 is 18 Mbits/sec. In this case, the identical value of 18 Mbits/sec among the values of the wireless transmission rates indicated in FIG. 3 is selected as the target value of the wireless transmission rate. As another example, let us consider the case where the transmission rate in the backhaul link 102 is 16 Mbits/sec. Then, the value of 18 Mbits/sec among the values of the wireless transmission rates indicated in FIG. 3 is selected as the target value of the wireless transmission rate, since the value of 18 Mbits/sec as the wireless transmission rate is closest to the value of 16 Mbits/sec as the transmission rate in the backhaul link 102.

When the value of 18 Mbits/sec is selected as the target value of the wireless transmission rate, the target SINR value in the wireless link 101 is determined to be the threshold TH3, which is the minimum SINR value to realize the MCS having the modulation type of QPSK and the encoding ratio of 3/4 and being indicated by the MCS index of 3 corresponding to the wireless transmission rate of 18 Mbits/sec. In this case, the target SINR value may be set in the range satisfying the condition of TH3<(Target SINR Value)<TH3+α. That is, in order to minimize the interference with adjacent cells, the target SINR value is set to a value or in a range corresponding to the minimum transmission power necessary for realizing the target value of the wireless transmission rate.

Referring back to FIG. 8, in step S45, the current SINR value acquired in step S43 is compared with the target SINR value determined in step S44 for each of the uplink and the downlink constituting the wireless link 101. When the difference between the current SINR value and the target SINR value is smaller than a threshold TH (i.e., when determined to be "YES" in step S45), the current SINR value is allowed to be maintained without performing an operation for further controlling the corresponding power amplifier, and therefore the process goes back to step S41.

When the difference between the current SINR value and the target SINR value is equal to or greater than the threshold TH (i.e., when determined to be "NO" in step S45), the power control unit 40 adjusts the voltage applied to the power amplifier (PA) in the transmitter 14 in the access point base station 1 and/or the voltage applied to the power amplifier (PA) in the transmitter 54 in the mobile terminal 3 in step S46 such that the corresponding target SINR value or values are realized in the uplink and/or the downlink. Specifically, the power control unit 40 controls the voltage applied to the power amplifier in the transmitter 54 in the mobile terminal 3 by using the control signal transmitted to the mobile terminal 3 through the downlink. In the operation of adjusting the voltages, the voltage applied to each power amplifier is decreased when the current SINR value is greater than the target SINR value, and increased when the current SINR value is smaller than the target SINR value.

As explained above, in the communication system according to the first embodiment, the access point base station 1 acquires the transmission rates in the wired backhaul link 102, and controls the transmission rate or rates in the wireless link 101 so that the difference or differences between the transmission rate or rates in the wireless link 101 and the transmission rate or rates in the backhaul link 102 are minimized (and preferably become zero). Therefore, the amount of the buffered data resulted from the difference or differences between the transmission rate or rates in the wireless link 101 and the transmission rate or rates in the backhaul link 102 is reduced, and the delay in data transfer, which may be caused by the buffering, can be avoided. In addition, in the case where the wireless link 101 is capable of a transmission rate higher than that of the backhaul link 102, the unnecessarily high transmission rate in the wireless link 101 is controlled and limited. The limitation on the transmission rate in the wireless link 101 decreases the target SINR value and the transmission power, and such a decrease in the transmission power suppresses the interference with the adjacent cells.

2. Second Embodiment

Hereinbelow, the second embodiment is explained. The communication system according to the second embodiment is different from the first embodiment in that the wireless transmission rate or rates are changed only by an adjustment of the transmission power, while the wireless transmission rate or rates in the first embodiment are changed by a selection of an MCS used in the wireless link. Since the communication quality (e.g., BER (Bit Error Rate) or BLER (Block Error Rate)) may be improved or degraded by the adjustment of the transmission power, the effective wireless transmission rate in consideration of retransmission control and the like is varied with the adjustment of the transmission power.

2.1 Configuration of Access Point Base Station

Figure 9:
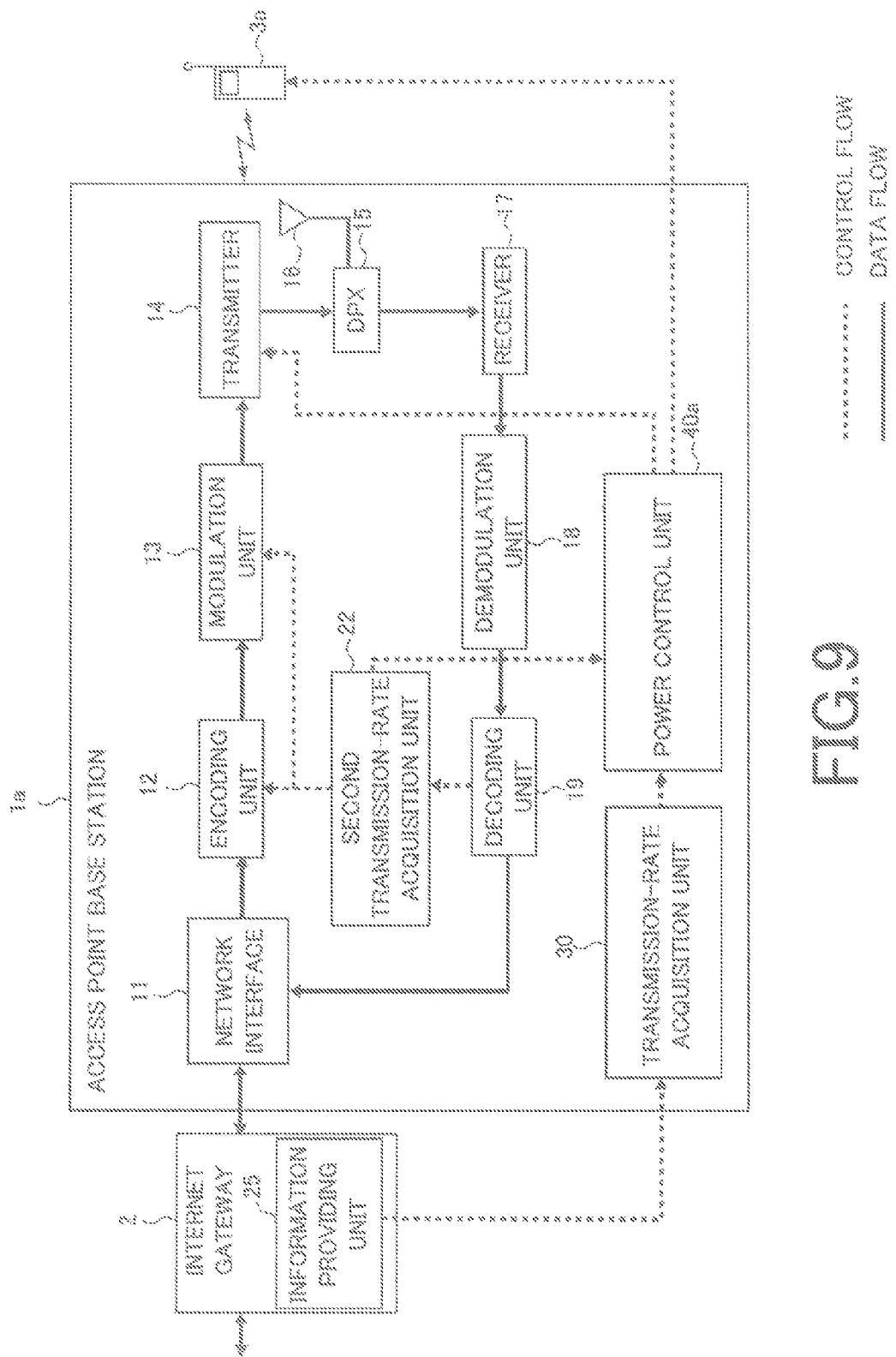
FIG. 9 is a block diagram illustrating a representative portion of a configuration of an access point base station according to a second embodiment.

An example of a configuration of an access point base station 1a according to the second embodiment is explained below with reference to FIG. 9, which illustrates a representative portion of the configuration of the access point base station 1a. In FIG. 9, the same elements as the elements in FIG. 2 are given the same reference numerals as in FIG. 2, and the descriptions of these elements are omitted for the sake of brevity.

As illustrated in FIG. 9, the access point base station 1a includes a second transmission-rate acquisition unit 22 as well as the constituent elements of FIG. 2. The second transmission-rate acquisition unit 22 is provided for acquiring the wireless transmission rate in the uplink from a mobile terminal 3a according to the second embodiment to the access point base station 1a. The manner of acquiring the wireless transmission rate is explained later.

The power control unit 40a acquires the wireless transmission rate (in the uplink) from the second transmission-rate acquisition unit 22 and the transmission rates in the backhaul link 102 from the transmission-rate acquisition unit 30. In addition, the power control unit 40a adjusts the voltage applied to the power amplifier in the transmitter 14 (the output power of which corresponds to the aforementioned first transmission power) and/or the voltage applied to the power amplifier in the transmitter 54 in the mobile terminal 3a (the output power of which corresponds to the aforementioned second transmission power) such that the difference or differences between the transmission rate or rates in the wireless link 101 and the transmission rate or rates in the backhaul link 102 are decreased. Specifically, the voltage applied to the power amplifier in the transmitter 54 in the mobile terminal 3a is controlled with the use of the control signal transmitted from the access point base station 1a to the mobile terminal 3a through the downlink. That is, the control signal transmitted to the mobile terminal 3a contains information on a control variable for the voltage applied to the power amplifier in the transmitter 54 or a target value of the voltage applied to the power amplifier in the transmitter 54. In FIG. 9, the above control over the mobile terminal 3a is schematically indicated by the bold dashed line having an arrow and extending from the power control unit 40a to the mobile terminal 3a.

2.2 Configuration of Mobile Terminal

Figure 10:
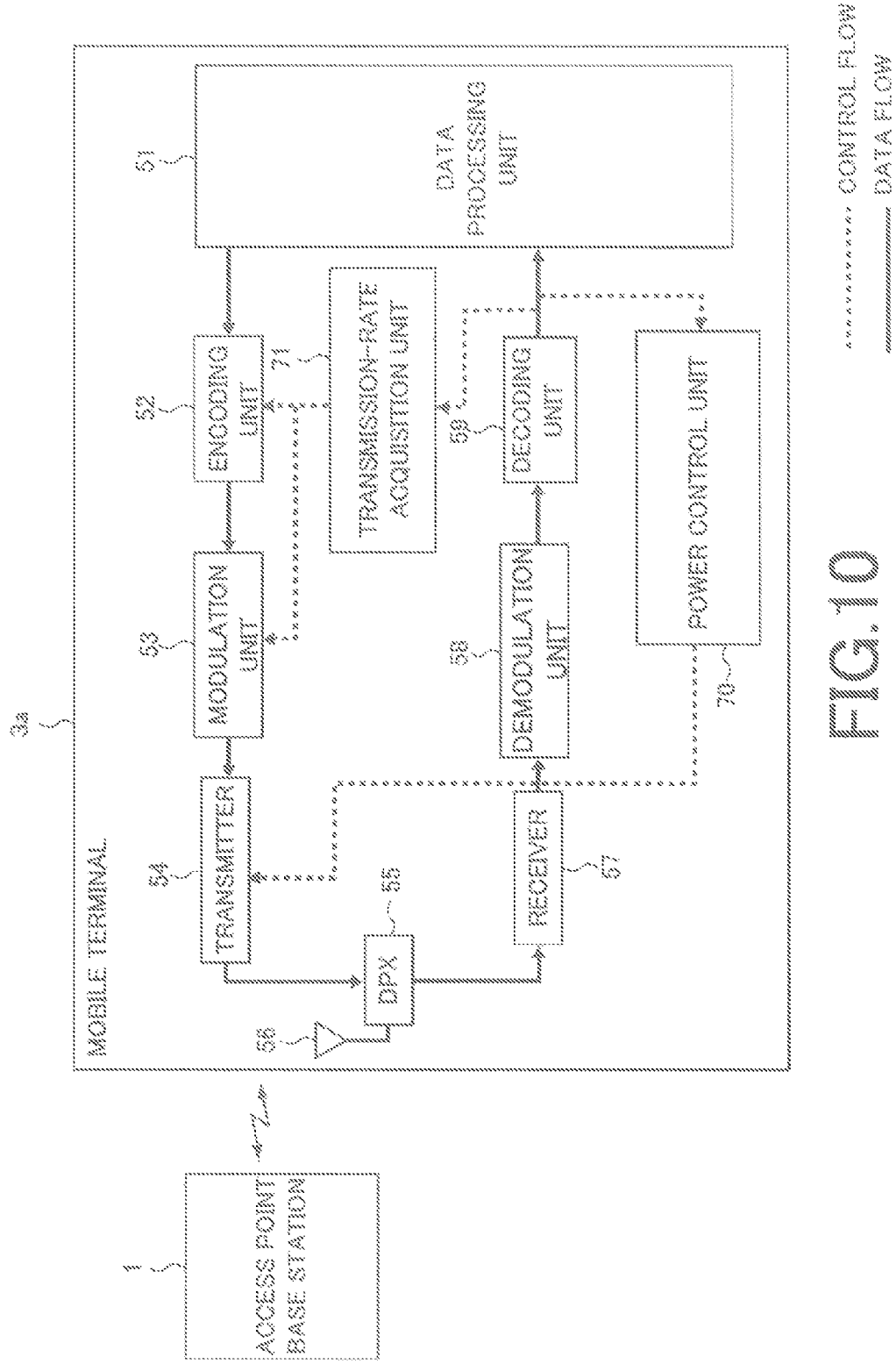
FIG. 10 is a block diagram illustrating a representative portion of a configuration of a mobile terminal according to the second embodiment.

An example of a configuration of the mobile terminal 3a is explained below with reference to FIG. 10, which illustrates a representative portion of the configuration of the mobile terminal 3a. The mobile terminal 3a illustrated in FIG. 10 is different from the mobile terminal 3 illustrated in FIG. 4 in that the mobile terminal 3a does not include the SINR calculator 60 and the MCS setting unit 61, since the operations of informing the access point base station 1 of the SINR value and setting the MCS for the uplink are not required in the mobile terminal 3a. In addition, the mobile terminal 3a includes a transmission-rate acquisition unit 71 for acquiring the wireless transmission rate in the downlink from the access point base station 1a to the mobile terminal 3a. The manner of acquisition of the wireless transmission rates is explained later.

2.3 Acquisition of Wireless Transmission Rate

A manner of acquiring the wireless transmission rates is explained below with reference to FIG. 11, which is a flow diagram illustrating an example of a process for acquiring a wireless transmission rate according to the second embodiment. Although only a process for acquiring the wireless transmission rate in the uplink is illustrated in FIG. 11, the wireless transmission rate in the downlink can also be acquired in a similar manner.

Figure 11:
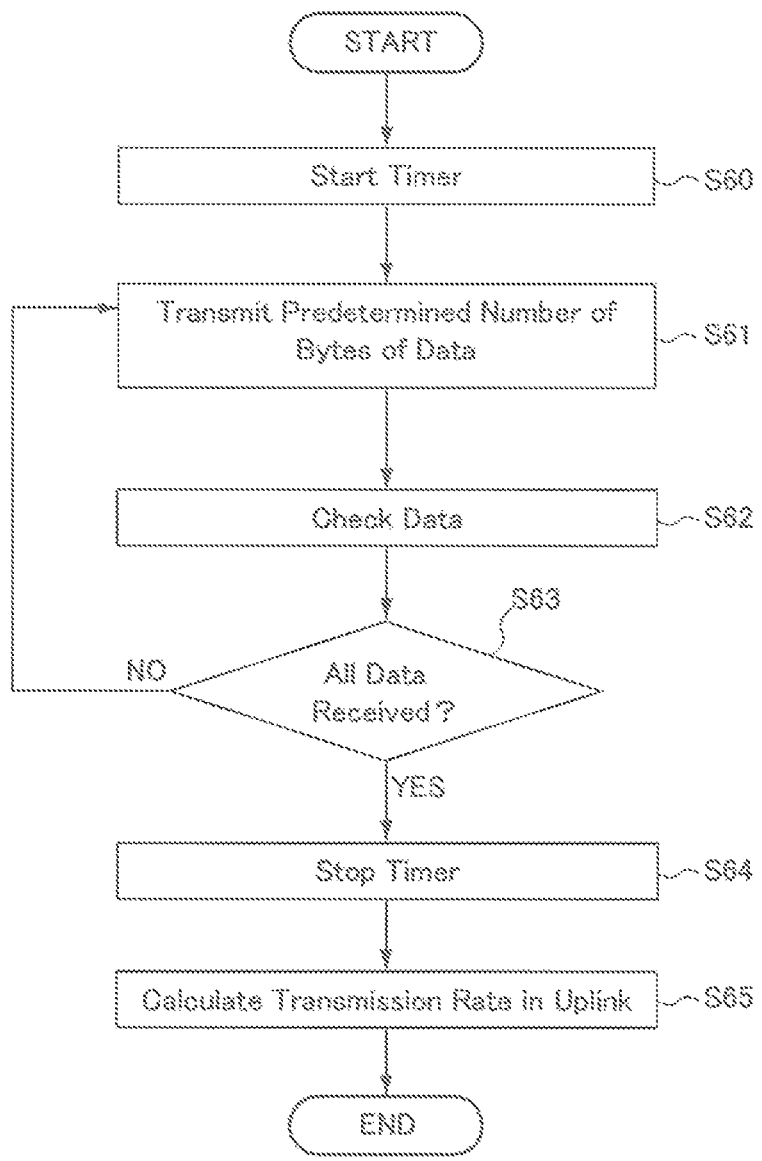
FIG. 11 is a flow diagram indicating a process for acquiring a wireless transmission rate according to the second embodiment.

In the process illustrated in FIG. 11, a transmission rate in the wireless link is calculated on the basis of information obtained through a transmission of a predetermined amount of data between the access point base station 1a and the mobile terminal 3a, where the transmission is performed for a predetermined time interval. Although not indicated in FIG. 11, the predetermined amount of data is transmitted between the access point base station 1a and the mobile terminal 3a in such a manner that the transmission and reception are performed by the mobile terminal 3a and the access point base station 1a in synchronization with each other. The synchronization can be realized, for example, in the case where the transmitter-side device (e.g., the mobile terminal 3a) informs the receiver-side device (e.g., the access point base station 1a) of the timing of the transmission.

In the process of FIG. 11, first, the second transmission-rate acquisition unit 22 in the access point base station 1a starts (activates) a timer in step S60, and the mobile terminal 3a starts transmission of a predetermined number of bytes of data in step S61 at the same time as the start of the timer of the access point base station 1a. Then, in step S62, the second transmission-rate acquisition unit 22 successively checks the predetermined number of bytes of data received by the access point base station 1a and decoded by the decoding unit 19, and confirms integrity of the data. When the access point base station 1a completes the reception of all of the predetermined number of bytes of data transmitted from the mobile terminal 3a (i.e., when determined to be "YES" in step S63), the second transmission-rate acquisition unit 22 stops, in step S64, the timer previously started in step S60. Subsequently, in step S65, the second transmission-rate acquisition unit 22 determines the duration for which the timer was activated, and calculates the transmission rate in the uplink on the basis of the amount of data received during the determined duration.

The transmission-rate acquisition unit 71 in the mobile terminal 3a performs operations for obtaining the transmission rate in the downlink, which are similar to the operations performed by the second transmission-rate acquisition unit 22 for obtaining the transmission rate in the uplink. Information on the transmission rate in the downlink, which is obtained by the transmission-rate acquisition unit 71, is inserted into a control signal to be transmitted to the access point base station 1a through the uplink. In the access point base station 1a, the above control signal is received, and the information on the obtained transmission rate in the downlink is extracted from the received control signal and supplied to the power control unit 40a.

2.4 Control of Power Amplifiers in Transmitters

Figure 12:
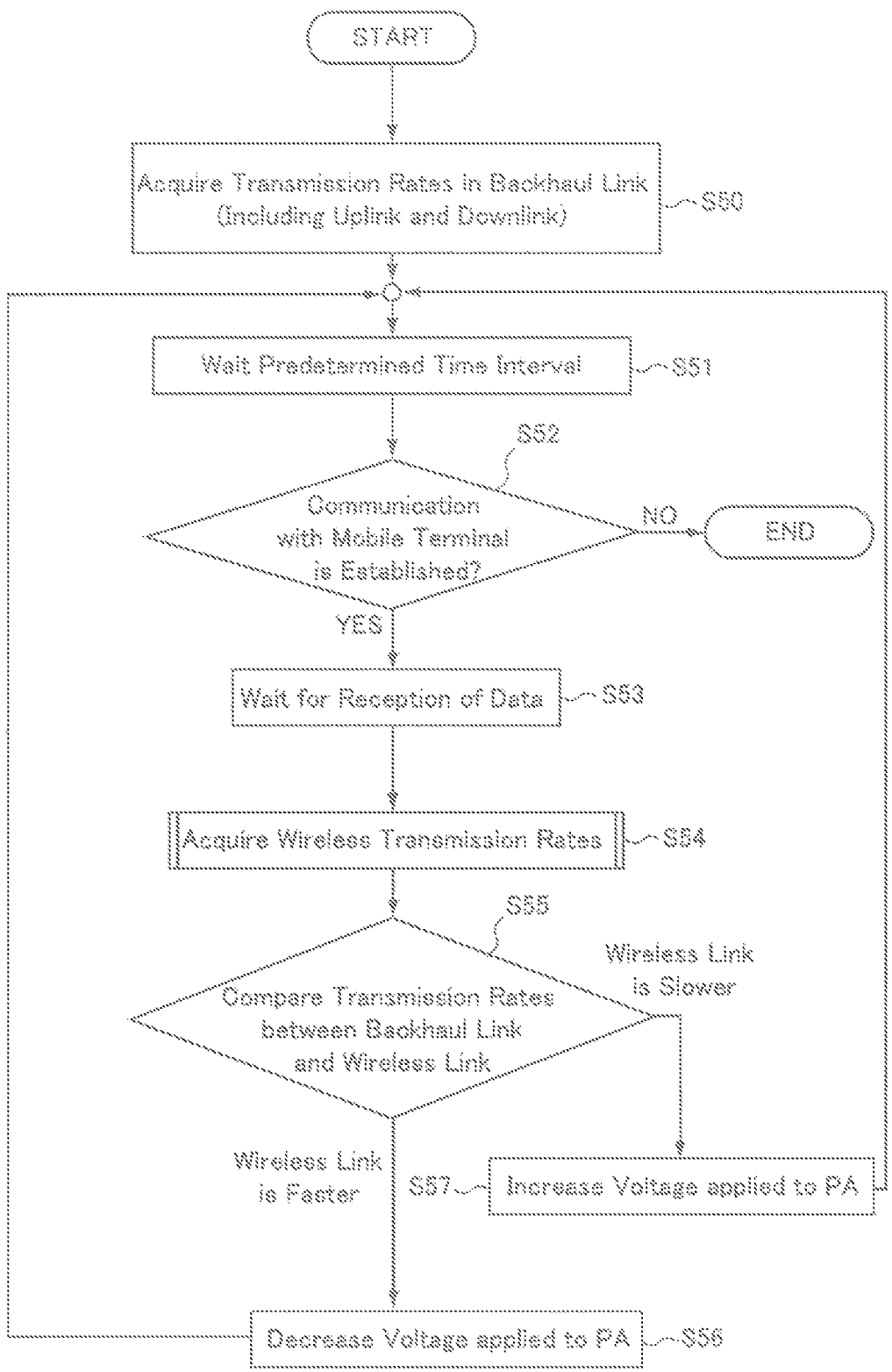
FIG. 12 is a flow diagram indicating a control process performed by the access point base station according to the second embodiment.

A process for controlling the power amplifiers in the transmitters in the access point base station 1a and the mobile terminal 3a is explained below with reference to FIG. 12, which is a flow diagram illustrating a control process mainly performed by the access point base station 1a according to the second embodiment. The process of FIG. 12 is performed, in particular, by the power control unit 40a in the access point base station 1a.

First, in step S50, the transmission-rate acquisition unit 30 in the access point base station 1a acquires from the information providing unit 25 in the Internet gateway 2 information on the transmission rates in the backhaul link 102 in the manner explained for the first embodiment with reference to FIGS. 5, 6, and 7. Since the transmission rates in the backhaul link 102 are considered not to greatly vary with time, the transmission-rate acquisition unit 30 acquires the information on the transmission rates in the backhaul link 102 only once in the example explained here. Alternatively, the transmission-rate acquisition unit 30 may acquire samples on the transmission rates in the backhaul link 102 a plurality of times, and perform statistical processing, for example, a process for averaging the samples.

Subsequently, the access point base station 1a waits for a predetermined time interval in step S51. The time interval is set such that the operation of controlling the power amplifiers is not performed too frequently. When the predetermined time interval elapses, the operation goes to step S52, in which it is determined whether or not a communication with the mobile terminal 3a is established. When the communication with the mobile terminal 3a is not established (i.e., when determined to be "NO" in step S52), it is unnecessary to further control the power amplifiers, and the process of FIG. 12 is ended.

When the communication with the mobile terminal 3a is established (i.e., when determined to be "YES" in step S52), the second transmission-rate acquisition unit 22 waits for a reception of data in step S53 for calculating the wireless transmission rates, and acquires in step S54 the wireless transmission rates in the uplink and the downlink in the manner explained with reference to FIG. 11.

Thereafter, in step S55, the power control unit 40a compares, for each of the uplink and the downlink, the transmission rate in the backhaul link 102 obtained in step S50 with the wireless transmission rate obtained in step S54. Then, the power control unit 40a decreases the voltage applied to the power amplifier (PA) corresponding to each of the uplink and the downlink in step S56 when the wireless transmission rate in the corresponding wireless link is higher than the corresponding transmission rate in the backhaul link 102 (i.e., when the wireless transmission in the corresponding wireless link is faster than the corresponding transmission in the backhaul link 102). On the other hand, the power control unit 40a increases the voltage applied to the power amplifier (PA) corresponding to each of the uplink and the downlink in step S57 when the wireless transmission rate in the corresponding wireless link is lower than the corresponding transmission rate in the backhaul link 102 (i.e., when the wireless transmission in the corresponding wireless link is slower than the corresponding transmission in the backhaul link 102).

At this time, the voltage applied to the power amplifier (PA) in the transmitter 54 in the mobile terminal 3a is controlled with the use of a control signal transmitted to the mobile terminal 3a through the downlink, where the control signal contains the aforementioned information on the control variable for the voltage applied to the power amplifier (PA) in the transmitter 54 or the target value of the voltage applied to the power amplifier (PA) in the transmitter 54. The power control unit 70 in the mobile terminal 3a controls the transmitter 54 on the basis of the above information contained in the control signal.

As explained above, in the communication system according to the second embodiment, the access point base station 1a acquires the transmission rates in the wired backhaul link 102 and the transmission rates in the wireless link 101, and controls the transmission power in the access point base station 1a and/or the transmission power in the mobile terminal 3a according to the difference or differences between the transmission rate or rates in the wired backhaul link 102 and the transmission rate or rates in the wireless link 101. According to the above control of the transmission power, when the transmission rate in an uplink or a downlink in the wireless link 101 is higher than the corresponding transmission rate in the backhaul link 102, the corresponding transmission power in the wireless link 101 is decreased. Consequently, the corresponding communication quality in the wireless link 101 is degraded, and the effective wireless transmission rate in consideration of retransmission and the like in the wireless link 101 is decreased. On the other hand, when the transmission rate in an uplink or a downlink in the wireless link 101 is lower than the corresponding transmission rate in the backhaul link 102, the corresponding transmission power in the wireless link 101 is increased. Consequently, the corresponding communication quality in the wireless link 101 is improved, and the effective wireless transmission rate in consideration of retransmission and the like in the wireless link 101 is increased. Therefore, in the case where the transmission power in the wireless link 101 is controlled as above, the difference or differences between the transmission rate or rates in the backhaul link 102 and the wireless transmission rate or rates in the wireless link 101 are controlled and reduced. Thus, the amount of data buffered as a result of the difference or differences between the transmission rate or rates in the backhaul link 102 and the wireless transmission rate or rates in the wireless link 101 is reduced, and the delay in data transfer, which may be caused by the buffering, is suppressed. Further, in the case where the wireless link 101 is capable of a transmission rate higher than that of the backhaul link 102, the transmission power in the wireless link 101 is reduced, so that the interference with adjacent cells is suppressed.

3. Third Embodiment

Hereinbelow, the third embodiment is explained. The communication system according to the third embodiment is different from the first embodiment in that the access point base station acquires the transmission rates in the backhaul link in a manner different from the manner (as illustrated in FIGS. 5 to 7) in the first embodiment.

Although the access point base stations in the first and second embodiments acquire the information on the transmission rates in the backhaul link 102 from the information providing unit 25 in the Internet gateway 2, the Internet gateway 2 does not contain the information providing unit 25 in some cases. In such cases, the access point base station can acquire the transmission rates in the backhaul link 102 through a server (not illustrated) on the Internet.

3.1 First Example

Figure 13:
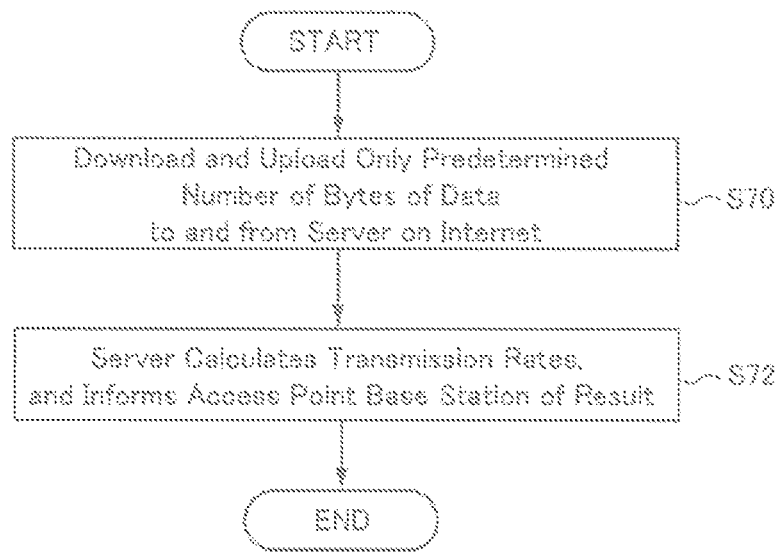
FIG. 13 is a flow diagram indicating an example of a process for acquiring the transmission rates in a backhaul link according to a third embodiment.

FIG. 13 is a flow diagram illustrating a first example of a process for acquiring the transmission rates in the backhaul link. As indicated in FIG. 13, first, in step S70, the access point base station downloads and uploads a predetermined number of bytes of data from and to a server on the Internet by using HTTP (HyperText Transfer Protocol) or FTP (File Transfer Protocol). Here, in order to improve the precision in measurement of the transmission rates, the amount of the downloaded or uploaded data may be increased as needed. When the downloading and uploading of the data is completed, in step S72, the server calculates the transmission rates on the basis of the amount of the downloaded data, the amount of the uploaded data, and the time needed for each of the downloading and the uploading, and informs the access point base station of the calculated transmission rates.

3.2 Second Example

Figure 14:
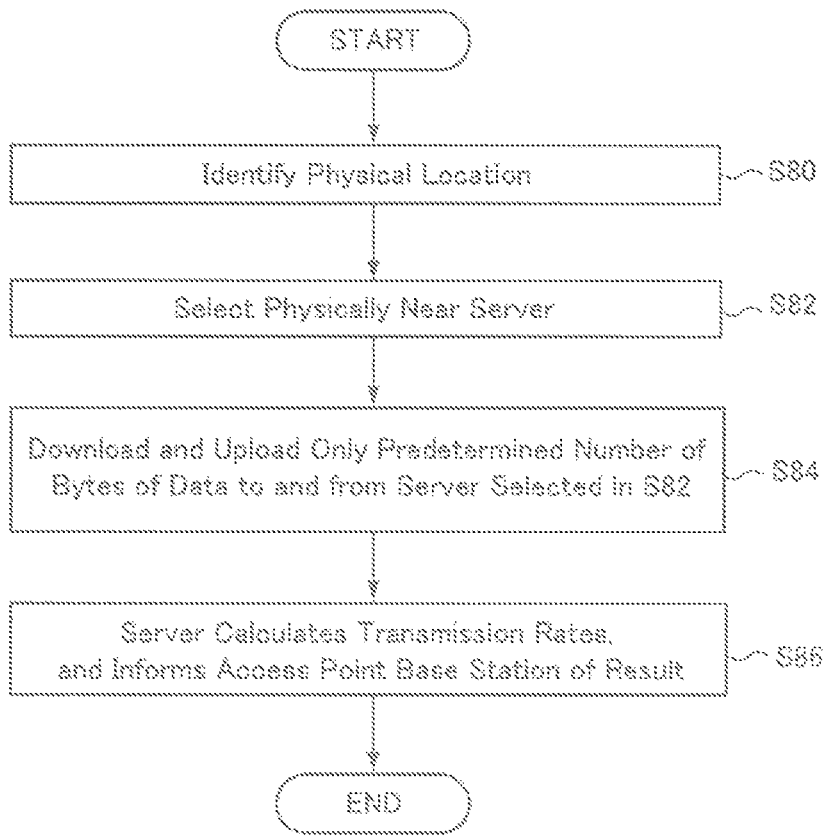
FIG. 14 is a flow diagram indicating an example of a process for acquiring the transmission rates in the backhaul link according to the third embodiment.

FIG. 14 is a flow diagram illustrating a second example of a process for acquiring the transmission rates in the backhaul link. As indicated in FIG. 14, first, in step S80, the access point base station identifies the physical location of the access point base station by identifying the DNS (Domain Name System) name (or the top-level domain), or by connecting the access point base station to a server on the Internet which can provide rough information on the location. When the access point base station identifies the physical location of the access point base station, the access point base station selects a server on the Internet which is physically located near the access point base station, in step S82. Thereafter, in steps S84 and S86, the access point base station performs operations with the selected server, which are similar to the operations in steps S70 and S72 indicated in FIG. 13. The time needed for buffering in a relay device decreases with a decrease in the distance from the access point base station to the selected server. In particular, in the case where the selected server is located near the access point base station, the time needed for buffering in the access point base station can be ignored, and the precision in the measurement of the transmission rates in the backhaul link 102 is improved.

4. Fourth Embodiment

Hereinbelow, the fourth embodiment is explained. The communication system according to the fourth embodiment is different from the first embodiment in that multiple antennas are used in one or each of the access point base station and the mobile terminal. In the case where multiple antennas are used, three types of antenna configurations of SIMO (Singular Input Multiple Output), MISO (Multiple Input Singular Output), and MIMO (Multiple Input Multiple Output) can be considered. In the configuration of SIMO, a single antenna is arranged on the transmitter side, and multiple antennas are arranged on the receiver side. In the configuration of MISO, multiple antennas are arranged on the transmitter side, and a single antenna is arranged on the receiver side. In the configuration of MIMO, multiple antennas are arranged on both of the transmitter side and the receiver side.

It is known that the SINR characteristics in communication systems using a SIMO configuration are improved, without an increase in the transmission power, in proportion to the number of antennas arranged on the receiver side when an algorithm such as MRC (Maximum Ratio Combining) or MMSE (Minimum Mean Square Error) is used.

It is also known that the SINR characteristics in communication systems using a MISO configuration are improved without an increase in the transmission power when a technique such as diversity or beamforming is used.

It is further known that the values of throughput (or SINR) in communication systems using a MIMO configuration are higher than that achieved in the communication systems using diversity when the transmission power is identical, because MIMO enables spatial multiplexing and therefore increases the channel capacity. (For example, in the case where the number of antennas on the transmitter side is $N_t$, and the number of antennas on the receiver side is $N_r$, the channels are represented by a $N_t*N_r$ matrix.)

The communication systems using any of the above antenna configurations are superior in SINR to the communication systems using a single antenna on both the transmitter side and the receiver side when the transmission power is identical. In other words, an identical target SINR value (for example, the target SINR value in the first embodiment) can be achieved with a lower transmission power in the communication systems using a multiple-antenna configuration as above than in the communication systems using only a single-antenna configuration as in the first embodiment.

FIG. 15 illustrates examples of correspondences between SINR conditions and optional MCSs for each number of spatial streams according to the fourth embodiment. The spatial streams are defined in IEEE802.11n for MIMO, and the SINR conditions are preset in the access point base station according to the present embodiment. In FIG. 15, the set of MCSs indicated for each number of spatial streams is identical. In addition, the wireless transmission rates indicated in correspondence with the respective MCSs in FIG. 15 are values achieved, for example, under a condition with the guard interval of 800 ns and the band width of 20 MHz. The information illustrated in FIG. 15 (which may be hereinafter referred to as second information) is stored in a second memory of the MCS setting unit 21 (see FIG. 16) in the access point base station. In FIG. 15, TH10 to TH17, TH20 to TH27, TH30 to TH37, and TH40 to TH47 each denotes a threshold (as a constant) for the SINR value. The thresholds satisfy the following condition: TH10<TH11< . . . <TH16<TH17, TH20<TH21< . . . <TH26<TH27, TH30<TH31< . . . <TH36<TH37, and TH40<TH41<. . . <TH46<TH47.

In the access point base station according to the present embodiment, once a target value of a transmission rate is given, the access point base station refers to the wireless-link information as illustrated in FIG. 15, and determines a target SINR value for realizing the target value of the transmission rate as in the first embodiment. However, the fourth embodiment is different from the first embodiment in that a plurality of MCS indexes are applicable for a target value of the wireless transmission rate, i.e., a plurality of target SINR values can exist in correspondence with a target value of the wireless transmission rate, because a plurality of different antenna configurations (different combinations of the number of the transmitter antennas and the number of receiver antennas) can be considered according to the present embodiment. For example, in the case where the target value of the transmission rate is 26 Mbps, FIG. 15 indicates that the following three combinations of the number of spatial streams and the MCS index are applicable:

(a1) The number of spatial streams is 1, and the MCS index is 3.
(a2) The number of spatial streams is 2, and the MCS index is 9.
(a3) The number of spatial streams is 4, and the MCS index is 24.

In the above cases, it is desirable to use as many antennas as possible. This is because when the target value of the wireless transmission rate is unchanged, an increase in the number of the spatial streams enables selection of a more reliable MCS. Therefore, the transmission power can be reduced, and thereby lowering the target SINR value.

The values of the wireless transmission rates indicated in FIG. 15 are exemplary values, and the wireless transmission rates can vary according to the type of antenna configuration (SIMO, MISO, or MIMO) and the numbers of the transmitter antennas and the receiver antennas. Therefore, it is preferable that the access point base station according to the present embodiment stores the second information as illustrated in FIG. 15 for each type of antenna configuration and each combination of the numbers of the transmitter antennas and the receiver antennas.

4.1 Configuration of Access Point Base Station

Figure 16:
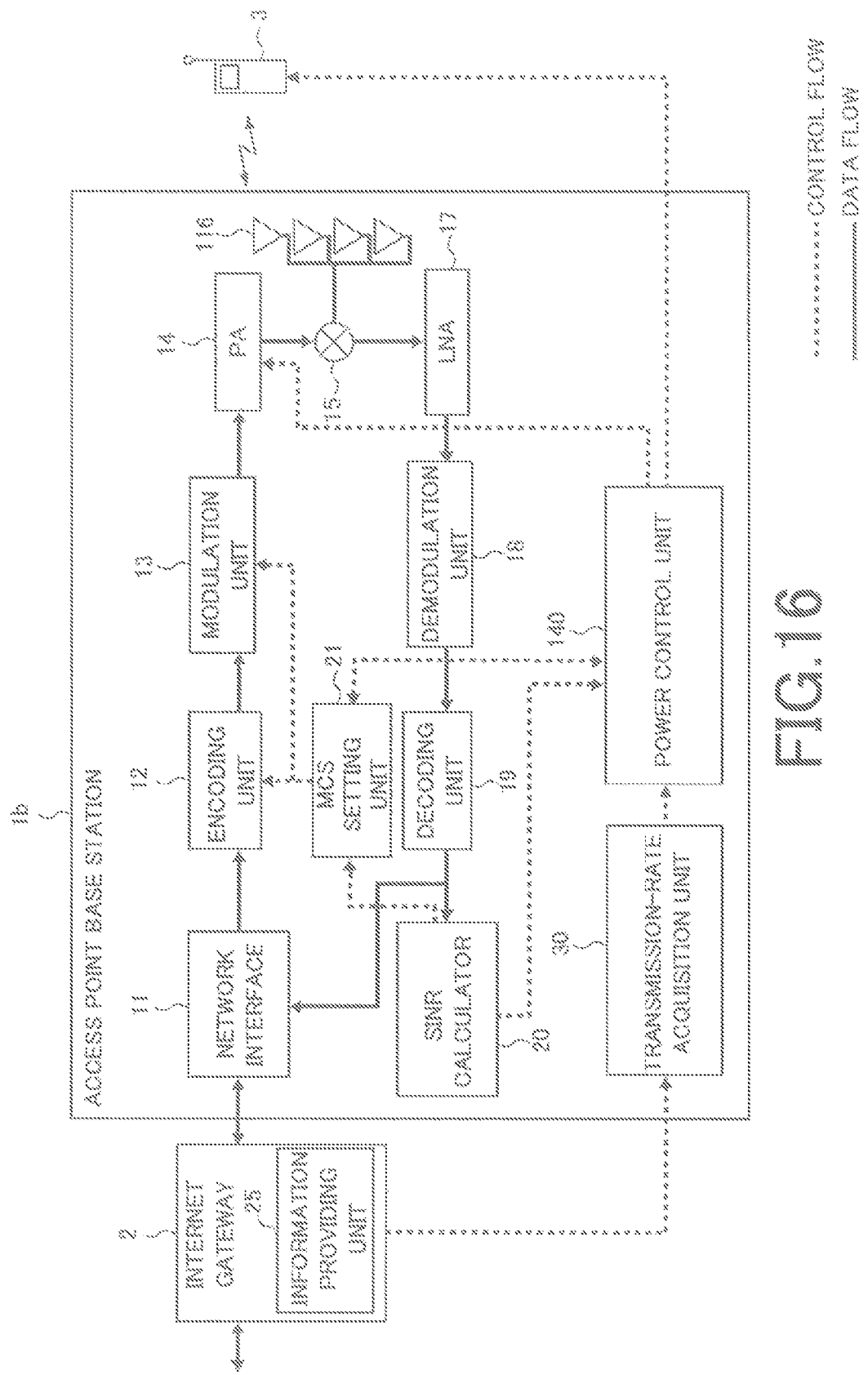
FIG. 16 is a block diagram illustrating a representative portion of a configuration of an access point base station according to the fourth embodiment.

An example of a configuration of an access point base station 1b according to the fourth embodiment is explained below with reference to FIG. 16, which illustrates a representative portion of a configuration of the access point base station 1b. In FIG. 16, the same elements as the elements in FIG. 2 are given the same reference numerals as in FIG. 2, and the descriptions of these elements are omitted for the sake of brevity.

As illustrated in FIG. 16, the access point base station 1b is different from the access point base station 1 illustrated in FIG. 2 in the provision of multiple antennas 116 and a power control unit 140. The multiple antennas 116 are arranged for realizing a communication system using multiple antennas such as a MIMO system. The power control unit 140 has a function of controlling the number of the multiple antennas 116 which operate, as well as the aforementioned functions of the power control unit 40 (in the access point base station 1 according to the first embodiment illustrated in FIG. 2).

4.2 Configuration of Mobile Terminal

Although not illustrated, the mobile terminal according to the fourth embodiment has multiple antennas for realizing communication using multiple antennas, such as MIMO communication between the mobile terminal and the access point base station 1b.

4.3 Control of Power Amplifiers in Transmitters

Figure 17:
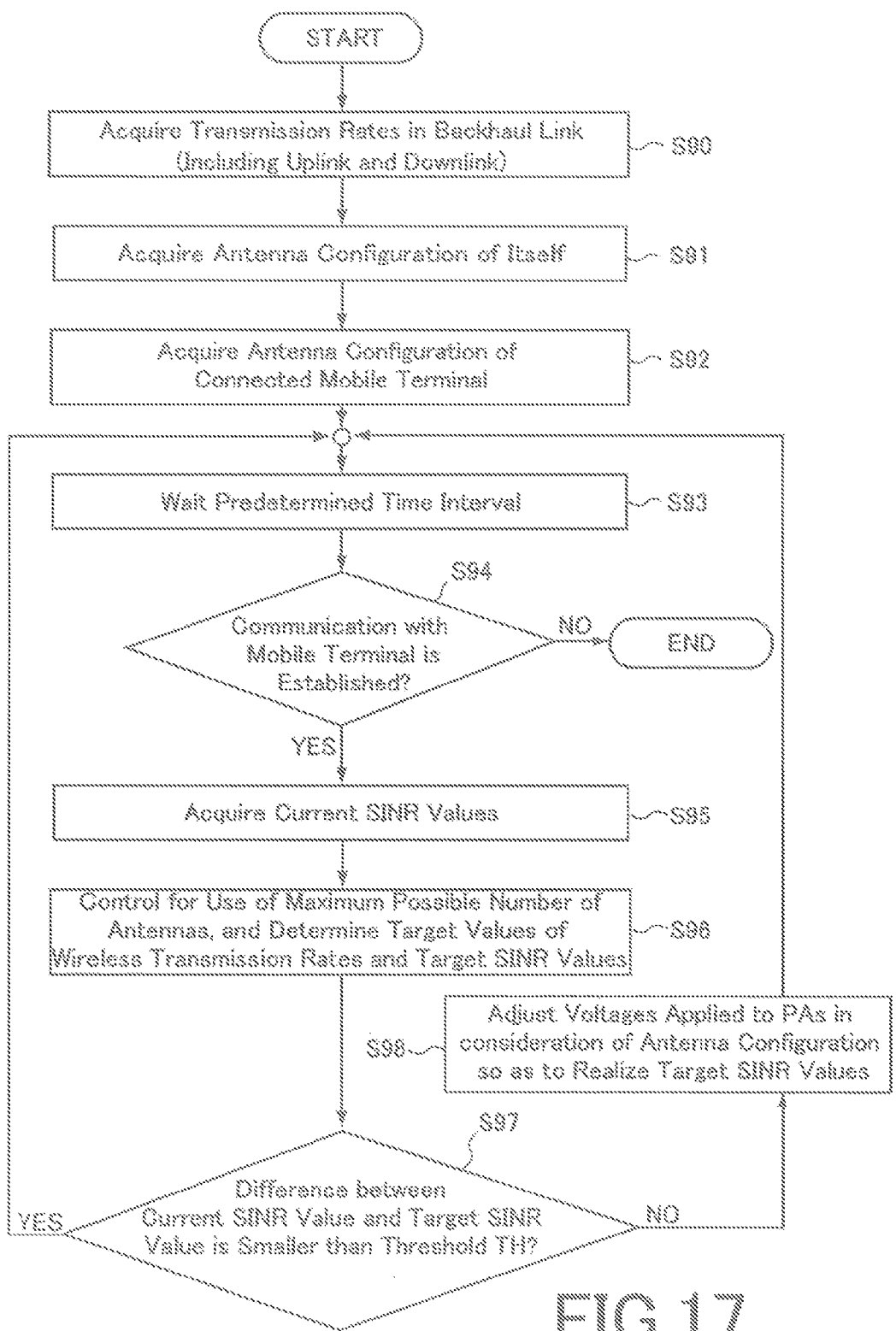
FIG. 17 is a flow diagram indicating a control process performed by the access point base station according to the fourth embodiment.

A process for controlling the power amplifiers in the transmitters in the access point base station 1b and the mobile terminal is explained below with reference to FIG. 17, which is a flow diagram illustrating a control process performed by the access point base station 1b according to the fourth embodiment. The process of FIG. 17 is performed, in particular, by the power control unit 140 in the access point base station 1b.

First, in step S90, the transmission-rate acquisition unit 30 in the access point base station 1b acquires from the information providing unit 25 in the Internet gateway 2 information on the transmission rates in the backhaul link 102 in the manner explained before for the first to third embodiments. Since the transmission rates in the backhaul link 102 are considered not to greatly vary with time, the transmission-rate acquisition unit 30 acquires the information on the transmission rates in the backhaul link 102 only once in the example explained here. Alternatively, the transmission-rate acquisition unit 30 may acquire samples on the transmission rates in the backhaul link 102 a plurality of times, and perform statistical processing, for example, a process for averaging the samples.

Subsequently, the power control unit 140 acquires information on the antenna configuration in the access point base station 1b in step S91, and acquires information on the antenna configuration in the mobile terminal coupled to the access point base station 1b in step S92, for example, by using the control signal transmitted from the mobile terminal. The information on the antenna configuration may be information indicating the number of operable antennas in each of the access point base station 1b and the mobile terminal.

Thereafter, the access point base station 1b waits for a predetermined time interval in step S93. The time interval is set such that the operation of controlling the power amplifiers is not performed too frequently. When the predetermined time interval elapses, the operation goes to step S94, in which it is determined whether or not a communication with the mobile terminal is established. When the communication with the mobile terminal is not established (i.e., when determined to be "NO" in step S94), it is unnecessary to further control the power amplifiers, and the process of FIG. 17 is ended.

When the communication with the mobile terminal 3a is established (i.e., when determined to be "YES" in step S94), the power control unit 140 acquires the current SINR values in the downlink and the uplink from the SINR calculator 20 and the MCS setting unit 21, respectively, in step S95. That is, the power control unit 140 acquires the SINR value in the uplink from the SINR calculator 20, and the SINR value in the downlink from the control signal transmitted from the mobile terminal. That is, the power control unit 140 acquires the SINR value in the downlink from the information from the mobile terminal.

Next, in step S96, the power control unit 140 controls the multiple antennas 116 in the access point base station 1b and the multiple antennas in the mobile terminal such that the maximum possible number of the multiple antennas operate, and determines target values of the wireless transmission rates and target SINR values. In addition, the power control unit 140 controls the multiple antennas in the mobile terminal by using a control signal transmitted to the mobile terminal.

Here, the power control unit 140 cooperates with the MCS setting unit 21 to determine the target values of the wireless transmission rates and the target SINR values, on the basis of the transmission rates in the backhaul link 102 obtained from the transmission-rate acquisition unit 30, such that the difference between the transmission rates in the wireless link 101 and the transmission rates in the backhaul link 102 is reduced.

Specifically, the target value of the wireless transmission rate in the uplink of the wireless link 101 and that in the downlink of the wireless link 101 are separately determined. The target value of the SINR in the uplink of the wireless link 101 and that in the downlink of the wireless link 101 are also separately determined.

A concrete example of a method of determining the target values of the wireless transmission rates and the target SINR values in the wireless link 101 is explained below with reference back to FIG. 15. In FIG. 15, the wireless transmission rates realized with the respective combinations of the number of spatial streams and the MCS (indicated by the MCS index) are illustrated.

As one example, let us consider the case where a transmission rate in the backhaul link 102 is 26 Mbits/sec. Then, 26 Mbits/sec is selected as the target value of the wireless transmission rate among the values of the transmission rate indicated in FIG. 15. As another example, let us consider the case where a transmission rate in the backhaul link 102 is 24 Mbits/sec. Then, 26 Mbits/sec, which is the nearest to the transmission rate in the backhaul link 102, is selected as the target value of the wireless transmission rate among the values of the transmission rate indicated in FIG. 15.

The wireless-link information of FIG. 15 indicates that the following three different combinations of the number of spatial streams and the MCS index can realize the wireless transmission rate of 26 Mbits/sec:

(b1) The number of spatial streams is 1, and the MCS index is 3.
(b2) The number of spatial streams is 2, and the MCS index is 9.
(b3) The number of spatial streams is 4, and the MCS index 24.

Since the communication system according to the present embodiment is controlled in the initial phase of step S96 such that the maximum possible number of antennas operate, the above combination (b3) is selected for realizing the wireless transmission rate of 26 Mbits/sec. However, if the sufficient number of antennas for realizing four spatial streams are not mounted in the communication system, the combinations (b2) and (b1) may be selected, in this order of priority.

In the case where the combination (b3) (having the number "4" of spatial streams and the MCS index "24") is selected, the threshold TH40 is determined to be the target SINR value, which is the minimum SINR value enabling the MCS indicated by the MCS index. In this case, the target SINR value may be set in the range defined by the inequalities TH40< (Target SINR Value)<TH40+α. That is, in order to minimize the interference with adjacent cells, the target SINR value can be set to a value or in a range corresponding to the minimum transmission power necessary for realizing the target value of the wireless transmission rate.

Referring back to FIG. 17, in step S97, the current SINR value acquired in step S95 is compared with the target SINR value determined in step S96 for each of the uplink and the downlink of the wireless link 101. When the difference between the current SINR value and the target SINR value is smaller than a threshold TH (i.e., when determined to be "YES" in step S97), the current SINR value is allowed to be maintained without performing an operation for further controlling the corresponding power amplifier, and therefore the process goes back to step S93.

When the difference between the current SINR value and the target SINR value is equal to or greater than the threshold TH (i.e., when determined to be "NO" in step S97), the power control unit 140 adjusts the voltage applied to the power amplifier (PA) in the transmitter 14 in the access point base station 1b and/or the voltage applied to the power amplifier (PA) in the transmitter in the mobile terminal in step S98 such that the corresponding target SINR value or values are realized. Specifically, the power control unit 140 controls the voltage applied to the power amplifier in the transmitter in the mobile terminal by using the control signal transmitted to the mobile terminal through the downlink. In the control operation, the voltage applied to each power amplifier is decreased when the current SINR value is greater than the target SINR value, and increased when the current SINR value is smaller than the target SINR value.

As explained above, in the communication system according to the fourth embodiment, the throughput is improved by utilizing the multiple antennas. Therefore, when the first and fourth embodiments are compared under the condition of a same target value of the wireless transmission rate, the communication system according to the fourth embodiment enables selection of a more reliable MCS, setting of a smaller target SINR value, and use of lower transmission power, than the communication system according to the first embodiment.

5. Fifth Embodiment

Hereinbelow, the fifth embodiment is explained.

Consider a communication system in which an access point base station is coupled to a plurality of selectable networks through respective wired links, and the transmission rates of each wired link are different. Further, assume that the transmission rate in a wireless link is set to a value identical to the transmission rate in a specific one of the wired links, and the transmission rate in the specific one of the wired links is low. In this case, when the access point base station is switched to communicate with another network whose transmission rate in the link is higher, the wireless transmission rate, which maintains at a low level, may become a bottleneck in the entire throughput. Therefore, in the case where an access point base station is coupled to a plurality of selectable networks through respective wired links, it is preferable to minimize the difference in the transmission rates between the wireless link and the fastest wired link among the plurality of wired links.

5.1 Communication System

Figure 18:
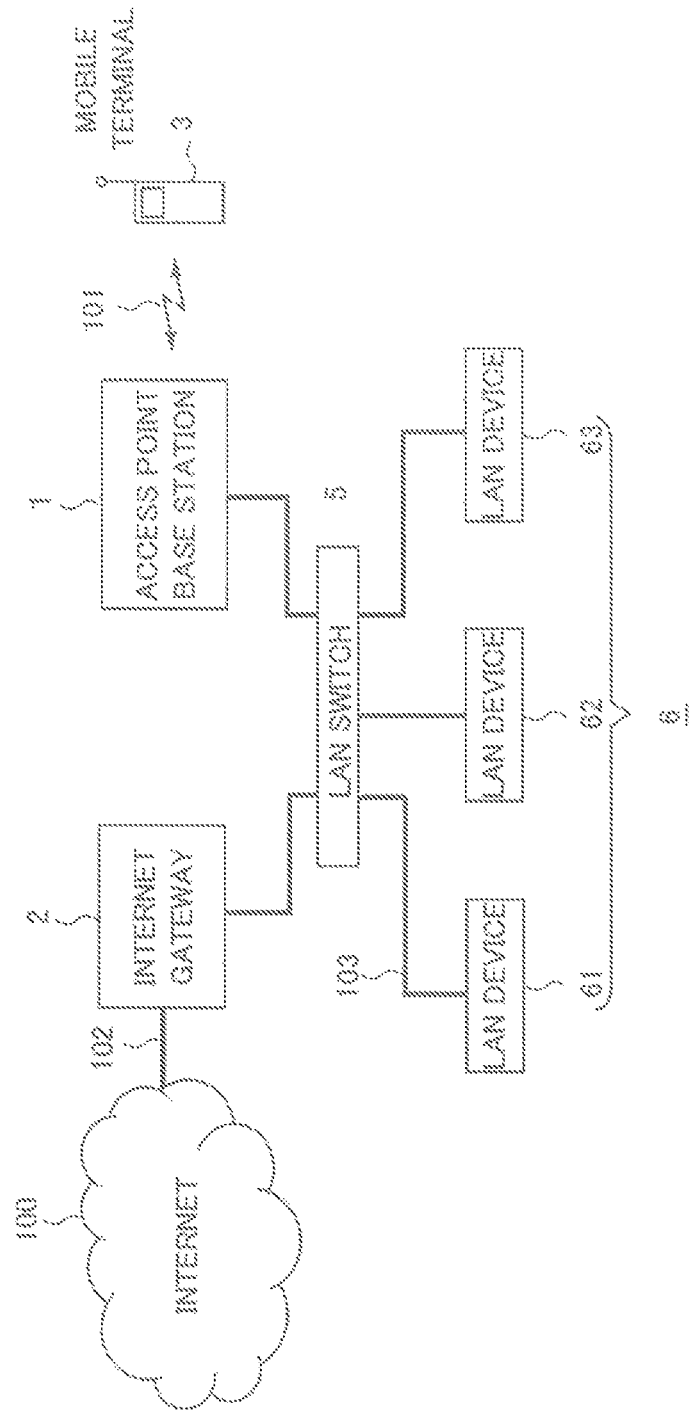
FIG. 18 is a diagram illustrating an outline of a communication system according to a fifth embodiment.

FIG. 18 is a diagram illustrating an outline of a communication system according to the fifth embodiment. The communication system of FIG. 18 is an example in which an access point base station is coupled to a plurality of networks through a plurality of wired links. In the example of FIG. 18, the plurality of networks include a LAN (Local Area Network) and the Internet.

As illustrated in FIG. 18, the communication system according to the present embodiment is different from the communication system according to the first embodiment (illustrated in FIG. 1) in that the access point base station 1 is coupled to the Internet gateway 2 through a LAN switch 5. In addition, a plurality of LAN devices 61, 62, and 63 (which may be hereinafter collectively referred to as the LAN device group 6) are coupled to the LAN switch 5 through LAN links 103. Each of the LAN devices 61, 62, and 63 is an information processing device such as a storage device, a personal computer, and the like. In the communication system having the above configuration, the mobile terminal 3 is able to selectively access the LAN and the Internet through the access point base station 1. The access point base station 1 can recognize the connection of the access point base station 1 with the LAN (including the plurality of LAN devices) by receiving from each LAN device a response to a specific message. For example, the specific message may be a UPnP message such as the UPnP advertisement message. In addition, the access point base station 1 can acquire the transmission rate in the LAN when the access point base station 1 is coupled to the LAN switch 5.

Generally, the transmission rate in the link with the LAN is higher than that in the link with the Internet. Therefore, in the communication system according to the present embodiment, it is assumed that the transmission rate in the link with the LAN is higher than that in the link with the Internet. According to the present embodiment, the access point base station 1 determines whether packets to be relayed by the access point base station 1 belong to the traffic between the mobile terminal and the LAN or the traffic between the mobile terminal and the Internet. When relaying communication between the mobile terminal and the LAN, the access point base station 1 performs a control operation for reducing the difference or differences in the transmission rate or rates between the wireless link to the mobile terminal and the wired link to the LAN.

5.2 Method for Identifying Traffic on the Basis of Packets

The access point base station 1 according to the present embodiment determines whether packets to be relayed by the access point base station 1 belong to the traffic between the mobile terminal and the LAN or the traffic between the mobile terminal and the Internet. In the following explanations, it is assumed that the packets relayed by the access point base station are IP packets in accordance with IPv4. However, the packets relayed by the access point base station in the communication system according to the fifth embodiment are not limited to such IP packets, and the packets may have any format as long as the source network and the destination network of the packets can be identified.

Figure 19:
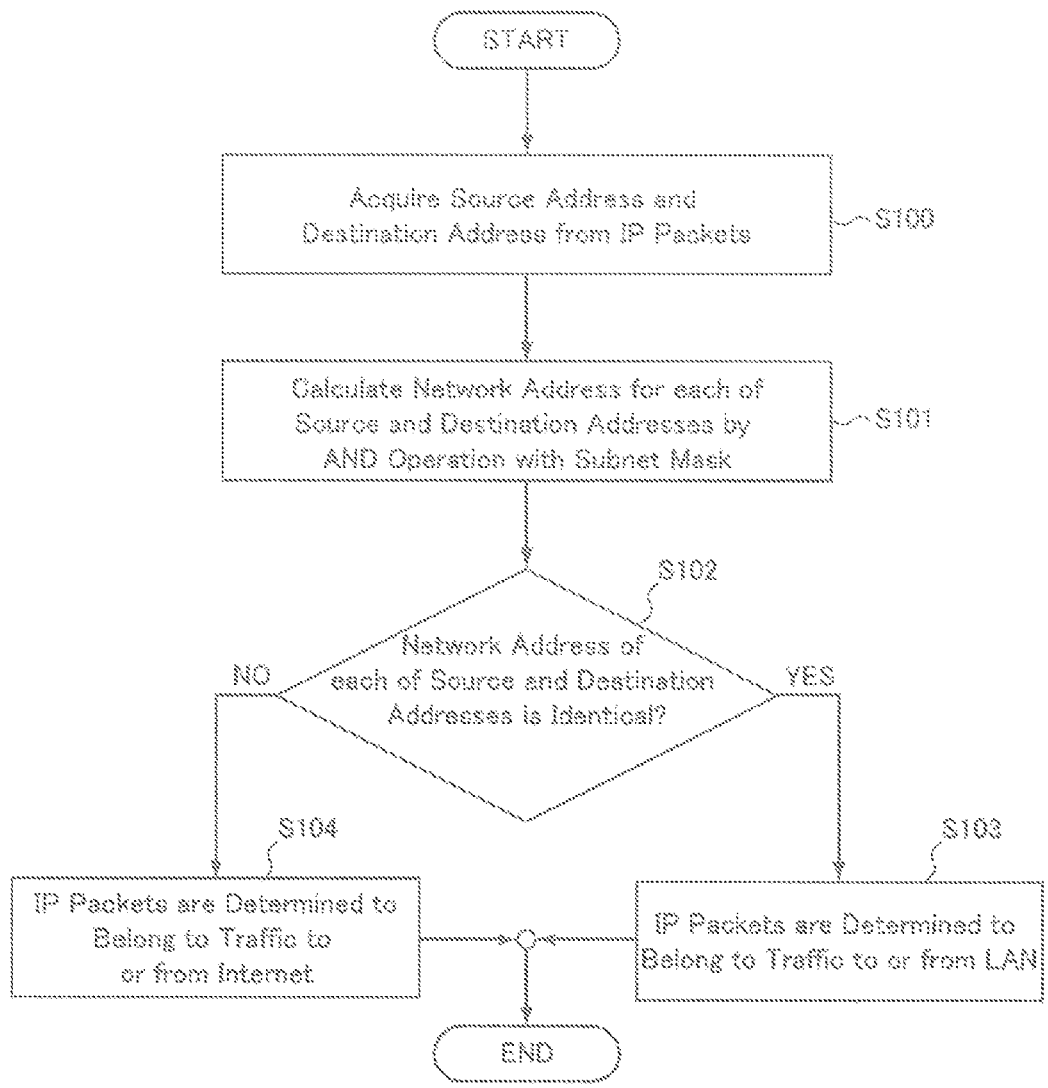
FIG. 19 is a flow diagram indicating a process for determining a network to which an IP packet is to be transferred by an access point base station according to the fifth embodiment.

FIG. 19 is a flow diagram illustrating a process for determining whether IP packets to be relayed by an access point base station 1 belong to the traffic between the mobile terminal and the LAN or the traffic between the mobile terminal and the Internet.

First, in step S100, the access point base station 1 acquires the source address and the destination address from the header information in the IP packets. Then, in step S101, the access point base station 1 performs an AND operation with a subnet mask, on each of the source address and the destination address, to obtain a network address for each of the source address and the destination address.

The operations in step S101 are explained in detail below, with reference to Table 1 (illustrating an example of the source address) and Table 2 (illustrating an example of the destination address). That is, in the following explanations, it is assumed that the source address of the IP packets received by the access point base station 1 is "192.168.1.3" and the destination address of the IP packets is "10.2.4.98". When the access point base station 1 receives the IP packets, the access point base station 1 accesses a DHCP (Dynamic Host Configuration Protocol) server, and acquires a subnet mask. In the example of the below Tables, the subnet mask is "255.255.255.0". Subsequently, the access point base station 1 obtains the network address in each of the source address and the destination address as illustrated in Tables 1 and 2 by performing a binary AND operation with the subnet mask on each of the source address and the destination address. In the example of Tables 1 and 2, the network address for the source address is "192.168.1.0", and the network address for the destination address is "10.2.4.0".

TABLE 1

|  | Decimal Representation | Binary Representation |
|---|---|---|
| Source Address | 192.168.1.3 | 11000000.10101000.00000001.00000011 |
| Subnet Mask | 255.255.255.0 | 11111111.11111111.11111111.00000000 |
| Network Address | 192.168.1.0 | 11000000.10101000.00000001.00000000 |

TABLE 2

|  | Decimal Representation | Binary Representation |
|---|---|---|
| Destination Address | 10.2.4.98 | 00001010.00000010.00000100.01100010 |
| Subnet Mask | 255.255.255.0 | 11111111.11111111.11111111.00000000 |
| Network Address | 10.2.4.0 | 00001010.00000010.00000100.00000000 |

When the result of the operations in step S101 indicates that the network address for each of the source address and the destination address is identical, (i.e., when determined to be "YES" in step S102), it is determined in step S103 that the IP packets belong to the traffic between the mobile terminal and the LAN. When the result of the operations in step S101 indicates that the network address for each of the source address and the destination address is not identical, (i.e., when determined to be "NO" in step S102), it is determined in step S104 that the IP packets belong to the traffic between the mobile terminal and the Internet.

5.3 Control of Power Amplifiers in Transmitters

Figure 20:
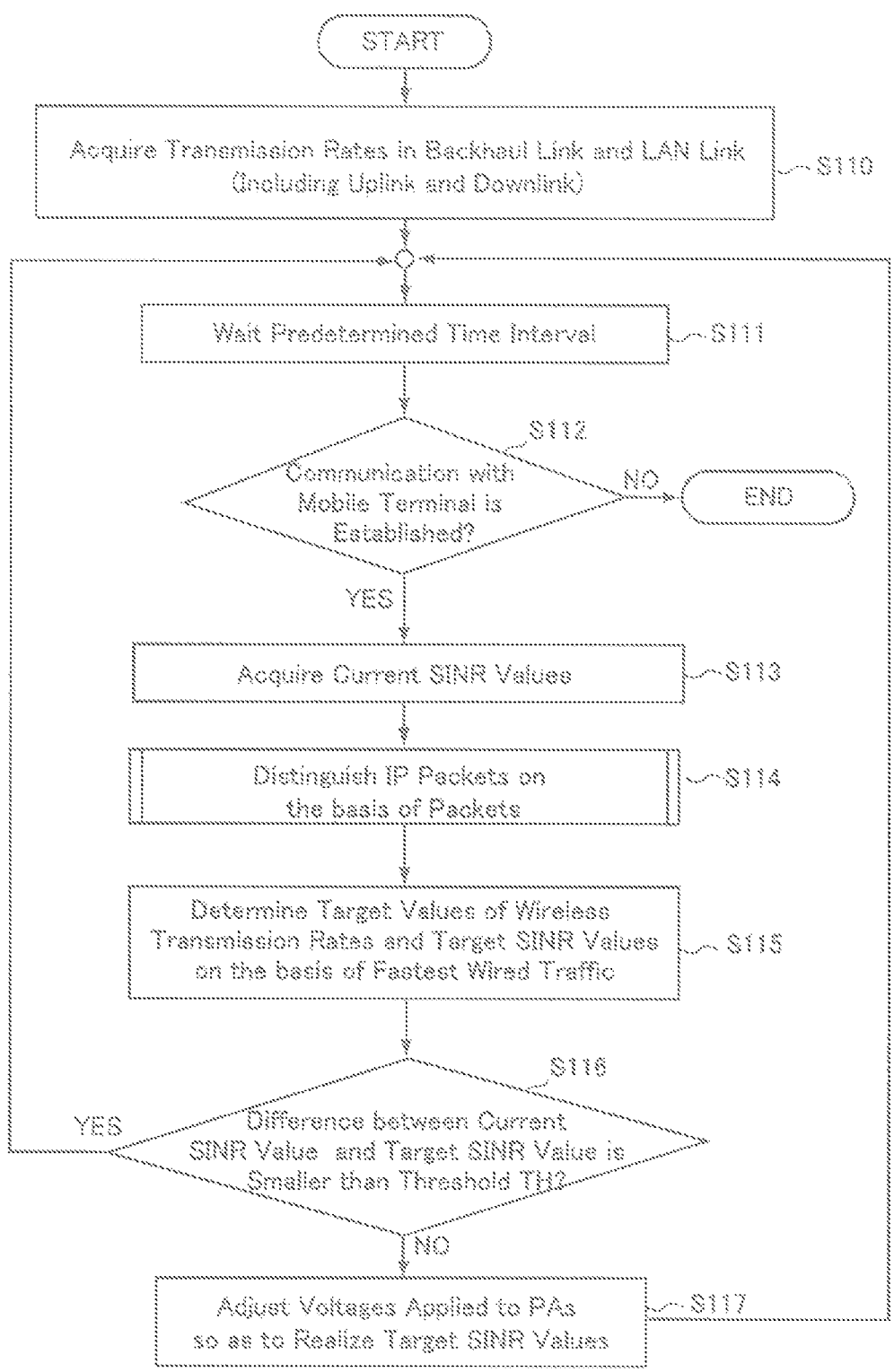
FIG. 20 is a flow diagram indicating a control process performed by the access point base station according to the fifth embodiment.

A process for controlling the power amplifiers in the transmitters in the access point base station 1 and the mobile terminal is explained below with reference to FIG. 20, which is a flow diagram illustrating a control process performed by the access point base station 1 according to the fifth embodiment. The process of FIG. 20 is performed, in particular, by the power control unit 40 in the access point base station 1. Since the operations in FIG. 20 are similar to the operations in the first embodiment explained with reference to FIG. 8 except for steps S114 and S115, the detailed explanations on the operations in the steps other than steps S114 and S115 are omitted for the sake of brevity.

First, in step S110, the transmission-rate acquisition unit 30 in the access point base station 1 acquires information on the transmission rates in the backhaul link 102 from the information providing unit 25 in the Internet gateway 2 through the LAN switch 5. In addition, the transmission-rate acquisition unit 30 acquires information on the transmission rates in the LAN links 103 in a similar manner to that explained for the first embodiment.

Then, the access point base station 1 waits for a predetermined time interval in step S111. When the predetermined time interval elapses, the operation goes to step S112, in which it is determined whether or not a communication with the mobile terminal 3 is established. When the communication with the mobile terminal 3 is not established (i.e., when determined to be "NO" in step S112), the process of FIG. 20 is ended.

When the communication with the mobile terminal 3 is established (i.e., when determined to be "YES" in step S112), the power control unit 40 acquires the current SINR values in the downlink and the uplink from the SINR calculator 20 and the MCS setting unit 21, respectively, in step S113.

Next, in step S114, the access point base station 1 determines whether the IP packets to be relayed by the access point base station 1 belong to the traffic between the mobile terminal and the LAN or the traffic between the mobile terminal and the Internet on the basis of the header information contained in the IP packets received by or to be transmitted from the access point base station 1, in the manner as explained with reference to FIG. 19.

Thereafter, in step S115, the power control unit 40 determines target values of the wireless transmission rate in the wireless link 101 and target SINR values on the basis of the transmission rate of the fastest traffic. For example, when the traffic determined in step S114 is the traffic between the mobile terminal and the Internet, the target values of the wireless transmission rates are determined on the basis of the transmission rates in the backhaul link 102 acquired in step S110. On the other hand, when the traffic determined in step S114 is the traffic between the mobile terminal and the LAN, the target values of the wireless transmission rates are determined on the basis of the transmission rates in the LAN links 103 acquired in step S110. That is, the access point base station according to the present embodiment adaptively controls the transmission rates (i.e., the transmission power) in the wireless link according to the traffic to which the packets to be relayed by the access point base station belong.

When packets which are detected, for example, in a predetermined period of time include, at least, one packet belonging to the traffic between the mobile terminal and the Internet and one packet belonging to the traffic between the mobile terminal and the LAN, the target values of the wireless transmission rates are determined, in step S115, on the basis of the transmission rates in the LAN links 103. That is, in step S115, the access point base station 1 determines the target values of the wireless transmission rates on the basis of the fastest traffic, considering that the transmission rates in the LAN links 103 are higher than the transmission rates in the backhaul link 102.

After the target values of the wireless transmission rates are determined, the target SINR values are determined in the manner explained with reference to FIG. 8, for example.

Thereafter, in step S116, the current SINR value acquired in step S113 is compared with the target SINR value determined in step S115 for each of the uplink and the downlink of the wireless link 101. When the difference between the current SINR value and the target SINR value is smaller than a threshold TH (i.e., when determined to be "YES" in step S116), it is unnecessary to further control the power amplifier (i.e., the current SINR value is allowed to be maintained), and therefore the process goes back to step S111.

When the difference between the current SINR value and the target SINR value is equal to or greater than the threshold TH (i.e., when determined to be "NO" in step S116), the power control unit 40 adjusts the voltage applied to the power amplifier (PA) in the transmitter 14 in the access point base station 1 and/or the voltage applied to the power amplifier (PA) in the transmitter 54 in the mobile terminal 3 in step S117 such that the corresponding target SINR value or values are realized.

As explained above, in the communication system according to the fifth embodiment, when the access point base station is coupled to a plurality of selectable networks through respective wired links, and the transmission rates of each wired link are different, the fastest traffic is identified on the basis of the packets to be relayed. Then, the transmission rate or rates in the wireless link 101 are controlled such that the difference or differences in the transmission rate or rates between the wireless link 101 and the wired link having the fastest traffic are minimized (and preferably becomes zero). Therefore, excessive reduction in the transmission rate or rates in the wireless link does not occur, and degrading of the throughput can be prevented.

In another viewpoint, in the case where the access point base station according to the present embodiment is coupled to a plurality of wired links in which the transmission rates are different, the access point base station can monitor the actual traffics in the wired links for determining the wired link with the fastest traffic, and can adaptively control the wireless transmission rates, i.e., the transmission power.

Although the fifth embodiment is explained above by using an example in which the plurality of wired networks coupled to the access point base station through a plurality of wired links include a LAN and the Internet, the communication system according to the fifth embodiment is not limited to the above example, and the access point base station may be coupled to more than two networks. In the communication systems according to the fifth embodiment in which the access point base station is coupled to more than two networks, the access point base station acquires the transmission rates of the respective networks, and sets the target value or values of the wireless transmission rate or rates on the basis of the transmission rate or rates of the fastest network. For example, since the transmission rates in the backhaul link and the LAN link are acquired in step S110 in the sequence of FIG. 20, the target value or values of the wireless transmission rate or rates may be determined in step S115 on the basis of a higher one or ones of the acquired transmission rates, which may be determined through a comparison of the acquired transmission rates.

6. Sixth Embodiment

When the voltage applied to each power amplifier is controlled in each of the first to fifth embodiments explained above, it is preferable to set a maximum allowable voltage Vmax, namely a given maximum power level. Specifically, the voltage applied to each power amplifier is limited such that the transmission power for obtaining a target SINR value does not exceed the maximum allowable power level in each of the first to fifth embodiments. When the voltage applied to each power amplifier is limited as above, it is possible to prevent interference with cells around the access point base station with higher reliability.

The maximum allowable voltage Vmax may not be a fixed voltage. There can be a need to change the maximum allowable voltage Vmax according to the wireless environment (i.e., the interference condition) around the access point base station. For example, in the case where a large base station ("macro" base station) exists near the access point base station, the SINR is likely to decrease, and therefore the maximum allowable voltage Vmax may be allowed to be relatively high. However, in the case where no macro base station exists near the access point base station, it is preferable to set a relatively low maximum allowable voltage Vmax in consideration of interference with adjacent cells which can be caused by the access point base station. In addition, it is preferable that the change in the maximum allowable voltage Vmax be made by an operator who is located distant from the access point base station.

Figure 21:
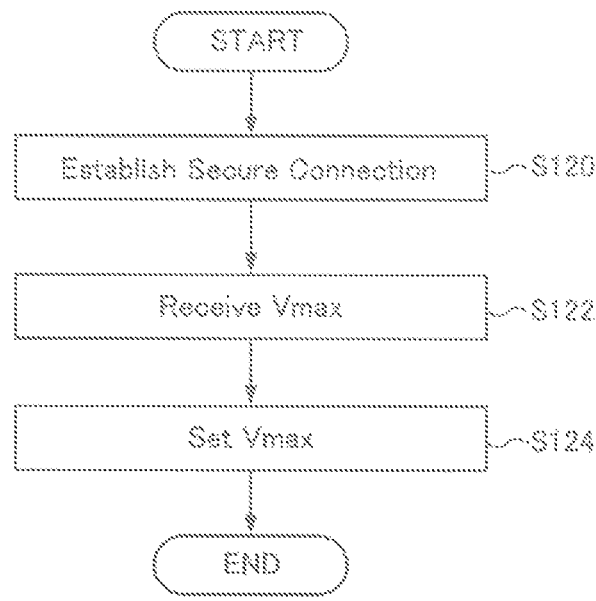
FIG. 21 is a flow diagram indicating a process for changing a maximum allowable voltage to be applied to a power amplifier by an information processing apparatus operated by an operator according to a sixth embodiment.

FIG. 21 is a flow diagram illustrating an outline of a process for changing the maximum allowable voltage Vmax to be applied to a power amplifier. The process is performed by an information processing apparatus operated by an operator located distant from the access point base station. When the process of FIG. 21 is executed, it is assumed that the access point base station and the information processing device operated by the operator can communicate with each other through a network. In the process of FIG. 21, first, in step S120, a secure connection is established between the access point base station and the information processing device operated by the operator. When the secure connection is established, the access point base station receives from the information processing device information on a new value of the maximum allowable voltage Vmax in step S122. Thereafter, the access point base station sets the maximum allowable voltage Vmax in the transmission-rate acquisition unit in step S124 with the received value.

Figure 22:
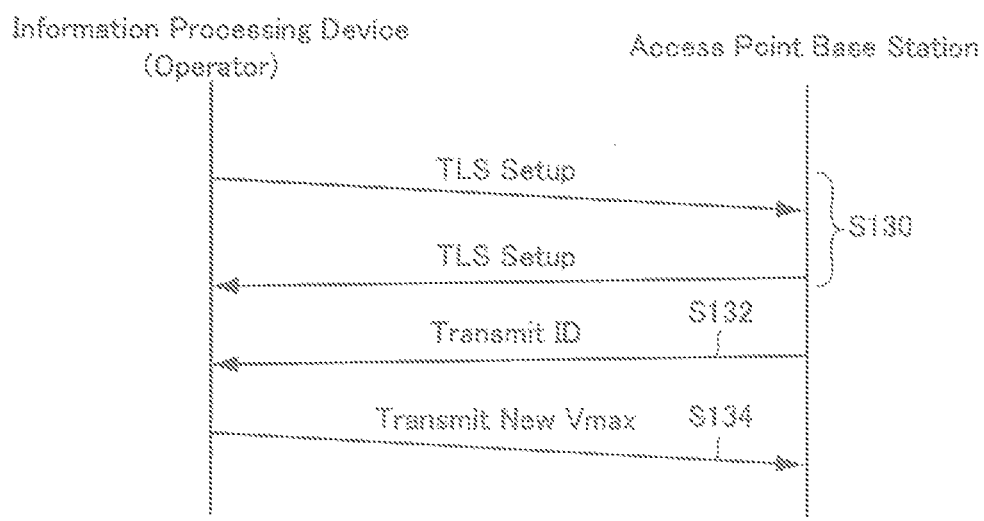
FIG. 22 is a sequence diagram indicating a process for changing a maximum allowable voltage to be applied to a power amplifier by an information processing apparatus operated by an operator according to the sixth embodiment.

The secure connection can be established, for example, by using TLS (Transport Layer Security). FIG. 22 illustrates a sequence of operations performed for changing the maximum allowable voltage Vmax, where a secure connection is established by TLS between the access point base station and the information processing device operated by the operator. As indicated in FIG. 22, first, in step S130, operations for TLS setup are performed between the access point base station and the information processing device operated by the operator. Then, in step S132, the access point base station transmits to the information processing device an ID which is unique to the access point base station, for identifying the location, the model type, and the like of the access point base station. Thereafter, in step S134, the information processing device transmits to the access point base station the information on the new value of the maximum allowable voltage Vmax.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication apparatus being coupled to a mobile terminal through a wireless link and to a network through a wired link, for relaying communication between the mobile terminal and the network, the communication apparatus comprising:
    a first transmission-rate acquisition unit for acquiring wired-link information related to a transmission rate in the wired link;
    a power control unit for controlling at least one of a first transmission power of the communication apparatus in downlink transmission to the mobile terminal and a second transmission power of the mobile terminal in uplink transmission from the mobile terminal so as to reduce a difference between a transmission rate in the wireless link and the transmission rate in the wired link; and
    a first memory unit for storing first information indicating the transmission rate in the wireless link and a communication quality level of the wireless link associated with each of a plurality of modulation-and-encoding schemes,
    wherein the power control unit selects one of the modulation-and-encoding schemes by reference to the first information so as to reduce the difference between the transmission rate in the wireless link and the transmission rate in the wired link, determines the communication quality level associated with the selected modulation-and-encoding scheme, and adjusts the at least one of the first transmission power and the second transmission power based on the determined communication quality level.

2. A communication apparatus being coupled to a mobile terminal through a wireless link and to a network through a wired link, for relaying communication between the mobile terminal and the network, the communication apparatus comprising:
    a first transmission-rate acquisition unit for acquiring wired-link information related to a transmission rate in the wired link;
    a power control unit for controlling at least one of a first transmission power of the communication apparatus in downlink transmission to the mobile terminal and a second transmission power of the mobile terminal in uplink transmission from the mobile terminal so as to reduce a difference between a transmission rate in the wireless link and the transmission rate in the wired link; and
    a second memory unit for storing second information indicating the transmission rate in the wireless link and a communication quality level of the wireless link associated with each of a plurality of combinations of modulation-and-encoding schemes and the number of spatial streams used in the wireless link,
    wherein the power control unit selects one of the modulation-and-encoding schemes, for the number of special streams applied, by reference to the second information so as to reduce the difference between the transmission rate in the wireless link and the transmission rate in the wired link, determines the communication quality level associated with the selected modulation-and-encoding scheme, and adjusts the at least one of the first transmission power and the second transmission power based on the determined communication quality level.

3. A communication method for relaying communications between a mobile terminal and a network through a wireless link coupled to the mobile terminal and through a wired link coupled to the network, the communication method comprising:
    acquiring wired-link information related to a transmission rate in the wired link; and
    controlling at least one of a first transmission power in downlink transmission to the mobile terminal and a second transmission power of the mobile terminal in uplink transmission from the mobile terminal so as to reduce a difference between a transmission rate in the wireless link and the transmission rate in the wired link,
    wherein the controlling includes:
    preparing first information indicating the transmission rate in the wireless link and a communication quality level of the wireless link associated with each of a plurality of modulation-and-encoding schemes;
    selecting one of the modulation-and-encoding schemes by reference to the first information so as to reduce the difference between the transmission rate in the wireless link and the transmission rate in the wired link;
    determining the communication quality level associated with the selected modulation-and-encoding scheme; and adjusting the at least one of the first transmission power and the second transmission power based on the determined communication quality level.

4. A communication method for relaying communications between a mobile terminal and a network through a wireless link coupled to the mobile terminal and through a wired link coupled to the network, the communication method comprising:

acquiring wired-link information related to a transmission rate in the wired link; and controlling at least one of a first transmission power in downlink transmission to the mobile terminal and a second transmission power of the mobile terminal in uplink transmission from the mobile terminal so as to reduce a difference between a transmission rate in the wireless link and the transmission rate in the wired link, wherein the controlling includes:

preparing second information indicating the transmission rate in the wireless link and a communication quality level of the wireless link associated with each of a plurality of combinations of modulation-and-encoding schemes and the number of spatial streams used in the wireless link;

selecting one of the modulation-and-encoding schemes, for the number of special streams applied, by reference to the second information so as to reduce the difference between the transmission rate in the wireless link and the transmission rate in the wired link;

determining the communication quality level associated with the selected modulation-and-encoding scheme; and adjusting the at least one of the first transmission power and the second transmission power based on the determined communication quality level.

* * * * *